United States Patent
Ahn et al.

(10) Patent No.: US 11,145,292 B2
(45) Date of Patent: Oct. 12, 2021

(54) METHOD AND DEVICE FOR UPDATING LANGUAGE MODEL AND PERFORMING SPEECH RECOGNITION BASED ON LANGUAGE MODEL

(71) Applicant: SAMSUNG ELECTRONICS CO., LTD., Suwon-si (KR)

(72) Inventors: Dong-hoon Ahn, Seoul (KR); Chi-youn Park, Suwon-si (KR); Kyung-min Lee, Suwon-si (KR); Jae-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/663,399

(22) Filed: Oct. 25, 2019

(65) Prior Publication Data

US 2020/0058294 A1    Feb. 20, 2020

Related U.S. Application Data

(63) Continuation of application No. 15/917,880, filed on Mar. 12, 2018, now Pat. No. 10,497,363, which is a
(Continued)

(30) Foreign Application Priority Data

Jul. 28, 2015    (KR) .................. 10-2015-0106772

(51) Int. Cl.
*G10L 15/06*    (2013.01)
*G10L 15/197*    (2013.01)
(Continued)

(52) U.S. Cl.
CPC .......... *G10L 15/063* (2013.01); *G06F 40/205* (2020.01); *G10L 15/02* (2013.01);
(Continued)

(58) Field of Classification Search
None
See application file for complete search history.

(56) References Cited

U.S. PATENT DOCUMENTS 5,835,888 A * 11/1998 Kanevsky ............... G10L 15/18
704/9
5,873,061 A *  2/1999 Hab-Umbach ....... G10L 15/142
704/251
(Continued)

FOREIGN PATENT DOCUMENTS

CN    1746973 A    3/2006
CN    102236639 A    11/2011
CN    102937972 A    2/2013

OTHER PUBLICATIONS

U.S. Appl. No. 15/917,880, filed Mar. 12, 2018; Ahn et al.
(Continued)

*Primary Examiner* — Douglas Godbold
(74) *Attorney, Agent, or Firm* — Nixon & Vanderhye P.C.

(57) ABSTRACT

A method of updating a grammar model used during speech recognition includes obtaining a corpus including at least one word, obtaining the at least one word from the corpus, splitting the at least one obtained word into at least one segment, generating a hint for recombining the at least one segment into the at least one word, and updating the grammar model by using at least one segment comprising the hint.

9 Claims, 23 Drawing Sheets

Related U.S. Application Data continuation of application No. 15/137,217, filed on Apr. 25, 2016, now Pat. No. 9,916,827.

(51) Int. Cl.
*G06F 40/205* (2020.01)
*G10L 15/02* (2006.01)

(52) U.S. Cl.
CPC ...... *G10L 15/197* (2013.01); *G10L 2015/025* (2013.01); *G10L 2015/027* (2013.01); *G10L 2015/0635* (2013.01)

(56) References Cited

U.S. PATENT DOCUMENTS

| | | | | |
|---|---|---|---|---|
| 6,526,380 | B1* | 2/2003 | Thelen | G10L 15/32 704/251 |
| 7,120,582 | B1* | 10/2006 | Young | G10L 15/063 704/255 |
| 7,302,392 | B1* | 11/2007 | Thenthiruperai | G10L 15/19 704/251 |
| 8,214,213 | B1 | 7/2012 | Ljolje | |
| 8,731,927 | B2* | 5/2014 | Schwarz | G10L 15/04 704/252 |
| 9,916,827 | B2 | 3/2018 | Ahn et al. | |
| 2003/0144846 | A1* | 7/2003 | Denenberg | 704/277 |
| 2003/0149561 | A1* | 8/2003 | Zhou | G10L 15/26 704/240 |
| 2003/0182131 | A1* | 9/2003 | Arnold | G10L 15/32 704/275 |
| 2004/0193426 | A1* | 9/2004 | Maddux | H03M 7/3082 704/275 |
| 2005/0182628 | A1* | 8/2005 | Choi | G10L 15/08 704/252 |
| 2005/0256715 | A1* | 11/2005 | Okimoto | G10L 15/197 704/257 |
| 2006/0053009 | A1 | 3/2006 | Jeong et al. | |
| 2007/0100618 | A1* | 5/2007 | Lee | G10L 15/1822 704/238 |
| 2014/0188475 | A1* | 7/2014 | Lev-Tov | G06F 16/685 704/254 |
| 2014/0244259 | A1* | 8/2014 | Rosario | G10L 15/19 704/254 |
| 2015/0058018 | A1* | 2/2015 | Georges | G10L 15/08 704/257 |
| 2015/0112679 | A1* | 4/2015 | Zhang | G10L 15/14 704/243 |

OTHER PUBLICATIONS

U.S. Appl. No. 15/137,217, filed Apr. 25, 2016; Ahn et al.
European Search Report dated Sep. 23, 2019 for EP Application No. 19171870.9.
European Examination Report dated Oct. 11, 2019 for EP Application No. 19171870.9.
Koehn et al., "Empirical Methods for Compound Splitting", European Chapter of the Association for Computational Linguistics, Apr. 12, 2003, pp. 187-193; XP058082379.
Creutz, "Induction of the Morphology of Natural Language: Unsupervised Morpheme Segmentation with Application to Automatic Speech", Espoo 2006; Jun. 16, 2006, XP055616065.
El-Desoky et al., Morpheme Level Hierarchical Pitman-Yor Class-based Language Methods for LVCSR of Morphologically Rich Languages, Proc. Interspeech 2013, Aug. 25, 2013; XP055324124.
Amr El-Desoky Mousa et al., "Sub-Lexical Language Models for German LVCSR", Spoken Language Technology Workshop (SLT), 2010 IEEE; Dec. 12, 2010; XP031859604; pp. 171-176.
Chinese Office Action dated Mar. 22, 2019 for CN Application No. 201610604984.3.
Extended Search Report dated Dec. 19, 2016 in counterpart European Patent Application No. 16167445.2.
McCandless, M., et al., "Empirical Acquisition of Language Models for Speech Recognition," 1994 International Conference on Spoken Language Processing, Yokohama, Japan, Sep. 18-22, 1994, vol. 2, pp. 835-838.
Whittaker, E.W.D., et al., "Particle-Based Language Modelling," Cambridge University Engineering Department, Oct. 16, 2000, 4 pages.
Kneissler, J.,et al., "Speech recognition for huge vocabularies by using optimized sub-word units," Proc. Eurospeech, 2001, Sep. 3, 2001, vol. 1, 4 pages.
Sun, J., et al., "Chinese Named Entity Identification Using Class-based Language Model," International Conference on Computational Linguistics, Proceedings of Coling, Aug. 24, 2002, pp. 1-7.
Hirsimaki, T., et al., "Unlimited vocabulary speech recognition with morph language models applied to Finnish," Computer Speech and Language, Elsevier, London, GB, Oct. 1, 2006, vol. 20, No. 4, pp. 515-541.

* cited by examiner

FIG. 6

[0.000482316919945] Channelat | 0.000482316919945 | channela 0.0005068869352278 | 0.006131007103461 | channel 0.0028844543123 at 0.0036852961349 | cha 0.0035125056223 nnelat 0.00048237755670 | 0.000482316919945 head,f(0)  f(1)  f(2)  f(2)  tail,t(0)      — 610

> 0 : channela + t = 1.050964 * 1.663640 * 0.175730 * 0.00613100 = 0.001883755
> 1 : **channel+ at = 5.6905280 * 7.639858 * 0.8211956 * 0.60109148 = 21.4597**  ← SPLITTING POINT
> 2 : cha+nnelat = 1.2177366 * 1.60001 * 0.0035125 * 0.1308924 = 0.00055992

— 620 score("channel+at") = [f(1) / f(0)] × [f(1) / f(2)] × [t(1) / t(2)] × [t(1) / t(0)]

[ | channel | / | channela | ] × [ | at | / | nnelat | ] × [ | at | / | nneat | ] × [ | at | / | t | ]

— 630

METHOD AND DEVICE FOR UPDATING LANGUAGE MODEL AND PERFORMING SPEECH RECOGNITION BASED ON LANGUAGE MODEL

CROSS-REFERENCE TO RELATED APPLICATION

This application is a continuation of U.S. application Ser. No. 15/917,880, filed Mar. 12, 2018, which is a continuation of U.S. application Ser. No. 15/137,217, filed Apr. 25, 2016 (now U.S. Pat. No. 9,916,827), which claims priority to KR 10-2015-0106772, filed Jul. 28, 2015, the entire contents of each of which are all hereby incorporated herein by reference in their entireties.

BACKGROUND

1. Field

The present disclosure relates to methods and devices for performing speech recognition by using a language model, and for example, to methods and devices for updating a language model using a corpus.

2. Description of Related Art

Speech recognition is a technology of automatically converting a received input of a user's speech into text so as to recognize the speech. Recently, speech recognition is being used as an interface technology to replace keyboard inputs in smartphones and televisions.

A speech recognition system may be split into a client receiving speech sound and an automatic speech recognition (ASR) engine performing the speech recognition from the speech sound, and the two portions may be designed separately from each other.

In general, a speech recognition system may perform speech recognition by using an acoustic model, a grammar model, and a pronunciation dictionary. To perform speech recognition on a prescribed word from speech sound in the speech recognition system, it is necessary to previously establish a grammar model and a pronunciation dictionary with respect to the prescribed word.

SUMMARY

Methods and devices for updating a language model so as to perform speech recognition on an out of vocabulary (OOV) word, which is a new word, and performing speech recognition by using a language model are provided.

Additional aspects will be set forth in part in the description which follows and, in part, will be apparent from the description.

According to an aspect of an example embodiment, a method of updating a grammar model used during speech recognition includes obtaining a corpus comprising at least one word, obtaining the at least one word from the corpus, splitting the at least one obtained word into at least one segment, generating a hint for recombining the at least one segment into the at least one word, and updating the grammar model using at least one segment comprising the hint.

The splitting may include determining a word to split based on one or more of an appearance frequency and a length of the at least one obtained word, and splitting the obtained word.

The splitting may include determining at least one candidate splitting point with respect to the obtained word, obtaining a score of each candidate splitting point based on appearance probability information of a segment based on each candidate splitting point, and determining a splitting point from among the at least one candidate splitting point based on the score, and splitting the obtained word into at least one segment based on the splitting point.

The splitting may include splitting the word included in the corpus into units of the segment based on the at least one segment.

The hint generating may include generating the hint with respect to the at least one segment based on whether the at least one segment is located at a boundary of the word.

The updating of the grammar model may include determining appearance probability information of the at least one segment during speech recognition, and updating the grammar model based on the determined appearance probability information.

The splitting may include splitting the at least one obtained word into segments of phonemes, syllables or morphemes.

The method may further include generating a pronunciation variant with respect to the at least one obtained word, obtaining a pronunciation variant corresponding to the generated pronunciation variant from among pronunciation variants included in a pronunciation dictionary, determining appearance probability information of the obtained pronunciation variant during speech recognition, and updating a second grammar model based on the determined appearance probability information.

The updating of the grammar model may include adding an entry token to the at least one obtained word or the detected segment, and updating a class-based grammar model based on the at least one obtained word or the detected segment including the entry token.

The updating of the grammar model may include determining a class to which the word or the segment belongs, determining whether to add the entry token or an exit token to the word or the segment, and adding the entry token or the exit token to the word or the segment based on a result of the determining, and updating a grammar model of the determined class based on the word or the segment.

According to an aspect of another example embodiment, a method of performing speech recognition includes obtaining speech data to perform speech recognition, detecting at least one segment by performing speech recognition based on a grammar model including appearance probability information of the at least one segment, and recombining the detected segment into a word based on a hint of the detected segment.

The method may further include performing speech recognition so that the word may be detected in a prescribed sequence based on a second grammar model when the word or the detected segment belongs to a first sequence of words.

The grammar model may include a class-based grammar model, and the method may include performing speech recognition based on a grammar model of a class to which an entry token belongs when the word or the detected segment includes an entry token, and performing speech recognition based on the class-based grammar model when the word or the segment includes an exit token.

According to an aspect of another example embodiment, a device for updating a grammar model includes a receiver configured to obtain a corpus including at least one word, a memory configured to store the grammar model; and a controller configured to obtain at least one word from the corpus, to split the at least one obtained word into at least one segment, to generate a hint for recombining the at least one segment into the at least one word, and to update the grammar model using at least one segment including the hint.

According to an aspect of another example embodiment, a device for performing speech recognition includes a receiver configured to obtain speech data to perform speech recognition, a memory configured to store a grammar model including appearance probability information of the at least one segment, and a controller configured to detect at least one segment by performing speech recognition based on the grammar model including the appearance probability information of the at least one segment, and to recombine he determined segment into the word based on a hint of the detected segment.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 6 is a graph illustrating an example of word splitting;

DETAILED DESCRIPTION

Figure 1:
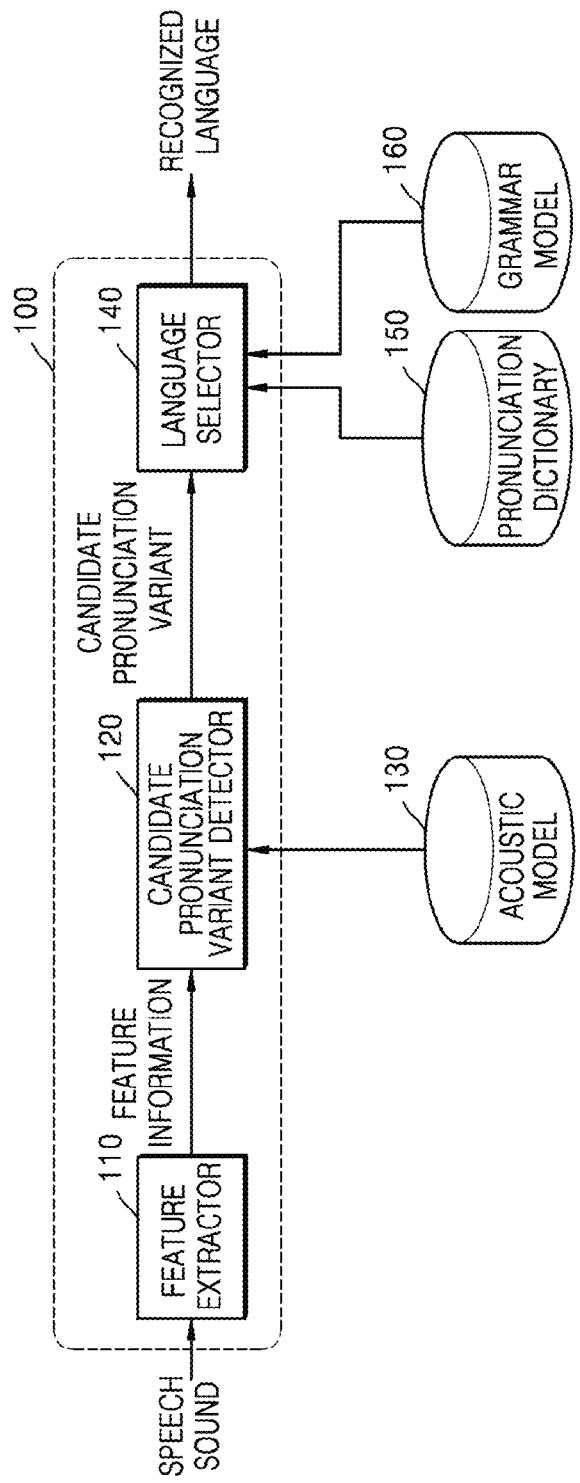
FIG. 1 is a block diagram illustrating an example device for performing speech recognition.

Reference will now be made in greater detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are described below, merely by referring to the figures, to explain aspects. Expressions such as "at least one of," when preceding a list of elements, modify the entire list of elements and do not modify the individual elements of the list.

The terms used in the present disclosure are briefly described and the present concept will be described in greater detail. The terms used in the present disclosure are those selected from currently widely used general terms in consideration of functions in the present disclosure. However, the terms may vary according to an engineer's intention, precedents, or advent of new technology. Also, for special cases, terms may be arbitrarily selected, in which meanings of the selected terms are described in detail in the description section. Accordingly, the terms used in the present disclosure are defined based on the meanings of the terms and the contents discussed throughout the disclosure, not necessarily by simple meanings thereof.

As used in the present disclosure, the term "and/or" includes any one of listed items and all of at least one combination of the items.

The terminology used herein is for the purpose of describing example embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

When a part may "include" a certain component, unless specified otherwise, it may not be construed to exclude another component but may be construed to further include other components. Terms such as "~portion", "~unit", "~module", and "~block" stated in the disclosure may signify a unit to process at least one function or operation and the unit may be embodied by hardware such as circuitry, a field-programmable gate array (FPGA) or an application-specific integrated circuit (ASIC), firmware, software, or a combination of hardware and software. However, the unit may be configured to be located in a storage medium to be addressed or configured to be able to operate one or more processors including processing circuitry. Accordingly, the unit as an example includes components such as software components, object-oriented software components, class components, and task components, processes, functions, attributes, procedures, sub-routines, segments of program codes, drivers, firmware, microcodes, circuits, data, a database, data structures, tables, arrays, and variables. The components and functions provided by the "units" may be combined into a smaller number of components and units or may be further divided into additional components and units. Accordingly, the present disclosure is not limited by a specific combination of hardware and software.

The attached drawings illustrating example embodiments of the present disclosure are referred to in order to gain a sufficient understanding of the disclosure, the merits thereof, and the objectives accomplished by the implementation of the disclosure. Hereinafter, the present disclosure will be described in greater detail by explaining example embodiments of the disclosure with reference to the attached drawings. Like reference numerals in the drawings denote like elements.

FIG. 1 is a block diagram illustrating an example device for performing speech recognition.

Referring to FIG. 1, a device 100 performing speech recognition may include, for example, a feature extractor (e.g., including processing circuitry for extracting a feature) 110, a candidate pronunciation variant detector (e.g., including processing circuitry) 120, and a language selector (e.g., including processing circuitry) 140. The feature extractor 110 extracts feature information of an input speech sound. The candidate pronunciation variant detector 120 detects at least one candidate pronunciation variant from the extracted feature information. The language selector 140 selects a final language that is recognized, based on appearance probability information of each candidate pronunciation variant. Furthermore, the language selector 140 may detect words corresponding to respective candidate pronunciation variants using a pronunciation dictionary 150, and thus may select the final language that is recognized based on appearance probability information of the detected words. The appearance probability information of words signifies appearance probability information of a certain word in a language that is recognized when speech recognition is performed. Hereinafter, each component of the device 100 will be described in greater detail below.

Upon receiving speech sound, the feature extractor 110 may detect only a speech part actually pronounced by a speaker, thereby extracting information indicating a feature of the speech sound. The information indicating a feature of the speech sound may include, for example, information indicating the shape of lips or the position of a tongue based on a waveform of the speech sound. A pronunciation variant corresponding to the speech sound may be detected based on the feature information extracted by the feature extractor 110.

The candidate pronunciation variant detector 120 may detect at least one candidate pronunciation variant that may match the speech sound, using the extracted feature information of the speech sound and an acoustic model 130. A plurality of candidate pronunciation variants may be detected according to the speech sound. For example, since 'jyeo' and 'jeo' are pronounced similarly to each other, a plurality of candidate pronunciation variants including similar pronunciations such as 'jyeo' and 'jeo' may be detected with respect to the same speech sound. Although the candidate pronunciation variants may be detected in word units, the present example embodiment is not limited thereto and the candidate pronunciation variants may be detected in various units such as, for example, phonemes or syllables.

The acoustic model 130 may include information to detect the candidate pronunciation variants from the feature information of the speech sound. Also, the acoustic model 130 may be generated from a large amount of speech data using a statistical method. For example, the acoustic model 130 may be generated from a plurality of pieces of unspecified spoken speech data, or may be generated from spoken speech data collected from a specific speaker. Accordingly, the acoustic model 130 may be individually applied based on a speaker during speech recognition.

The language selector 140 may obtain appearance probability information of each of the candidate pronunciation variants detected by the candidate pronunciation variant detector 120, using, for example, a pronunciation dictionary 150 and a grammar model 160. The language selector 140 selects a final language that is recognized, based on the appearance probability information of each of the candidate pronunciation variants.

Furthermore, the language selector 140 may obtain words corresponding to respective candidate pronunciation variants using the pronunciation dictionary 150 and may obtain an appearance probability value for each word corresponding to the respective candidate pronunciation variants using the grammar model 160. The language selector 140 may finally select a candidate pronunciation variant corresponding to a word having the largest appearance probability value. A word corresponding to the finally selected candidate pronunciation variant may be output as a word that is recognized.

The pronunciation dictionary 150 may include information needed to obtain a word corresponding to the candidate pronunciation variants detected by the candidate pronunciation variant detector 120. The pronunciation dictionary 150 may be established from pronunciation variants obtained based on a phoneme variation phenomenon of each word.

A pronunciation of a word may not be consistent because the pronunciation of the word may be changed based on words preceding and following the word, a position of the word in the sentence, or characteristics of a speaker. Furthermore, an appearance probability value signifies an appearance probability of the word or a simultaneous appearance probability of the word with a specific word. The device 100 may perform speech recognition considering a context using an appearance probability value of a word or a pronunciation variant included in the grammar model 160.

The device 100 obtains words of the candidate pronunciation variants using the pronunciation dictionary 150 and obtains the appearance probability information of words corresponding to the pronunciation variants using the grammar model 160, thereby performing speech recognition. The present example embodiment is not limited thereto and the device 100 may obtain the appearance probability information of the pronunciation variants from the grammar model 160 without obtaining words corresponding to the pronunciation variants through the pronunciation dictionary 150.

For example, when the candidate pronunciation variant detector 120 detects a candidate pronunciation variant for 'skul', the language selector 140 may obtain a word for 'school' as a word corresponding to the detected candidate pronunciation variant 'skul' by using the pronunciation dictionary 150. The language selector 140 may finally select a word corresponding to speech sound based on appearance probability information of the word 'school' and may output the selected word.

The grammar model 160 may include the appearance probability information of words. The appearance probability information may exist for each word. The device 100 may obtain the appearance probability information of words included in each of the candidate pronunciation variants from the grammar model 160.

For example, when a word A appears before an existing word B appears, the grammar model 160 may include P(B|A) which is appearance probability information of the existing word B. For example, the grammar model 160 may include P(B|A C) which makes it a condition that words A and C, for example, a plurality of words, appear before a word B appears. For example, P(B|A C) may make it a condition that both words A and C appear before a word B appears. For example, the grammar model 160 may include appearance probability information P(B) with respect to a word B and is not related to a conditional probability. P(B) signifies an appearance probability of the word B during speech recognition.

The device 100 may finally determine a recognized word based on the appearance probability information of words corresponding to respective candidate pronunciation variants in the language selector 140 using the grammar model 160. For example, the device 100 may finally determine a word having information indicating that the word has the highest appearance probability value as a recognized word. The language selector 140 may output the recognized word as text information.

The present example embodiment is not limited to perform speech recognition in units of words and may be performed using different language units, in the above-mentioned description of FIG. 1. Furthermore, it may be described that speech recognition is performed on speech data including English, but the present example embodiment is not limited thereto and the description may be identically applied even when speech recognition is performed on speech data including various languages.

A method of updating a grammar model in order to perform speech recognition on an out of vocabulary (OOV) word that is a new word that cannot be detected by speech recognition and performing speech recognition will be described in greater detail below with reference to FIGS. 2 to 7. For example, when a grammar model is updated so as to perform speech recognition on an OOV word, it is possible to update the grammar model without additional information about the OOV word.

An OOV word signifies a word that cannot be detected by speech recognition as appearance probability information of the OOV word is not included in the grammar model. The OOV word is not limited to a language in units of words and may include languages using various units such as phonemes or syllables.

Figure 2:
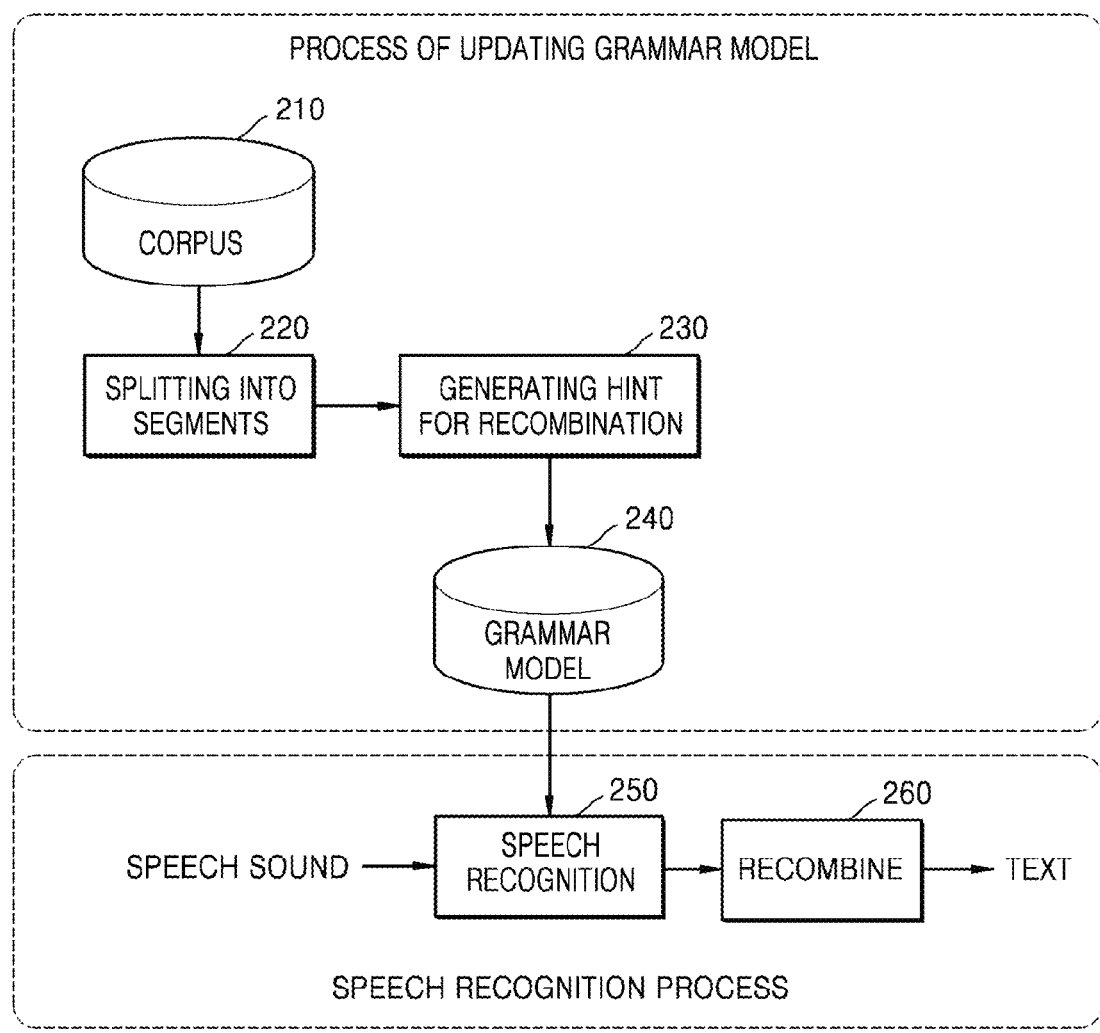
FIG. 2 is a block diagram illustrating an example process of updating a grammar model and performing speech recognition using the updated grammar model.

FIG. 2 is a block diagram illustrating an example process of updating a grammar model and performing speech recognition using the updated grammar model. For example, an OOV word may be split into smaller units and a grammar model may be updated based on segments further split into smaller units.

Referring to FIG. 2, in a process of updating a grammar model, a grammar model 240 may be updated so that speech recognition may be performed on an OOV word based on a corpus 210 including the OOV word. Furthermore, the OOV word may be detected from speech sound to a speech recognition block 250 based on the updated grammar model 240.

A device for updating a grammar model may obtain a new word from the corpus 210. The OOV word may be not detected during speech recognition since appearance probability information is not included in the grammar model 240. The device may update the grammar model 240 so that speech recognition may be performed on the OOV word included in the corpus 210.

The device may split the OOV word into segments having smaller units in block 220. The device may split one OOV word at least once. The device may split one OOV word not including spaces. Two segments may be generated every time the device splits one OOV word once. The OOV word may be split into segments having various units such as syllables, phonemes, or words. Furthermore, the device may further split a segment generated by splitting.

A repetitive splitting method of a word will be described according to an example embodiment.

For example, one word sequence for 'Two Rivers Elementary School' may be repeatedly split into 'Two+RiversElementarySchool' and 'Two+Rivers+Elementary+School'.

For example, one word sequence for 'Couldyouplease-tellmethenumburrofaChineserestaurant?AndmayIorder-now?' may be repeatedly split into 'Couldyoupleasetell-methenumburrofaChineserestaurant?AndmayI+ordernow?', 'CouldyoupleasetellmethenumburrofaChineserestaurant?+And+may+I+order+now?', 'Couldyoupleasetellme+thenumburrofaChineserestaurant?+And+may+I+order-now?', 'Couldyouplease+tell+me+thenumburrofaChineserestaurant?+And+may+I+order+now?, 'Couldyou+please+tell+me+the+numburr+of+AChineserestaurant?+And+may+I+order+now?'.

The device may split the word sequence until the number of segments or words capable of being added to the grammar model 240 reaches a prescribed number or more. A calculating amount excessively increases during speech recognition as the size of the grammar model 240 extremely increases. Therefore, the device may update the grammar model 240 so that the number of segments or words capable of being added to the grammar model 240 reaches a prescribed number or less.

As a frequency of the splitting increases, a possibility of overlapping the generated segment and words included in the grammar model 240 becomes higher. When the generated segment overlaps the words included in the grammar model 240, a value of a probability of overlapping the words included in the grammar model 240 may be updated based on a segment appearance frequency. Therefore, as a frequency of the splitting increases, the number of words capable of being recognized compared to the words included in the grammar model 240 increases.

However, a short word sequence may have a higher possibility of generating speech recognition error compared to a long word sequence. For example, when an OOV word splits into morpheme or phoneme units, a speech recognition error may easily occur since there are many words or segments preceding and following it. Furthermore, it is easy to include contractions, misspelled words, spacing errors in text included in the corpus 210; however, it may difficult to identify the errors when the text is split into very small units such as morphemes or phonemes and added to the grammar model 240. Therefore, a possibility of an error occurring may become higher during speech recognition.

Meanwhile, when a long OOV word is added to the grammar model 240, the number of words or segments added to the grammar model 240 may greatly increase to as large as the number of the OOV words included in the corpus 210.

The device may generate a prescribed number of the segments with respect to the OOV word included in the corpus 210. The number may be determined based on a size of the grammar model 240 so that a calculating amount may not excessively increase. According to an example embodiment, speech recognition performance may be improved as the grammar model 240 may be updated with a prescribed number of segments compared to when a word that is too short or too long is added to the grammar model 240.

Furthermore, the device may generate segments including a hint so that the segments may be effectively recombined into the word before being split into segments during speech recognition. The device performing speech recognition may determine whether to add spaces between each segment based on the hint of the segments. The device may update the grammar model 240 using the segments including the hint. The grammar model 240 may include appearance probability information of the segments including the hint.

A method of splitting a new word by the device will be described in more detail below with reference to FIGS. 4 to 6.

In block 230 of FIG. 2, the device may generate a hint for recombination with respect to each of the split segments. The hint may be determined based on a type of a word before being split. When the word is split into a plurality of segments, it is desirable that a portion adjacent to a splitting point of each segment is recombined without including spaces while recombining. Furthermore, it is desirable that a portion located on the opposite side of the splitting point of each segment is recombined including spaces while recombining. The device may generate a hint representing whether there are spaces in the segment so that the segment may be recombined into the word before being split.

The device may update the grammar model 240 using the segment including the hint.

Furthermore, in a speech recognition process, the device performing speech recognition may perform the speech recognition using the grammar model 240 updated by the device with respect to an input speech sound in block 250 of FIG. 2. At least one candidate pronunciation variant may be detected based on feature information of the speech sound during speech recognition as illustrated in FIG. 1. Moreover, a recognized language may be output based on appearance probability information of a word corresponding to the detected candidate pronunciation variant. The appearance probability information of the word may be obtained from the grammar model 240 updated by the device. The grammar model 240 may include not only words but also segments of various units including a hint.

The grammar model 240 may include identical segments or different segments including different hints. Each of the segments including different hints may include appearance probability information under the condition that there are preceding and following words. Each of the segments including different hints may include appearance probability information according to which word appears preceding and following the segment. Although each of the segments including different hints may correspond to an identical pronunciation variant, one segment may be determined based on the appearance probability information.

In block 260 of FIG. 2, the device performing speech recognition may recombine at least one segment into the word before being split into segments while updating a grammar model based on a hint included in the segments. The device may output the word recombined according to the hint of the segments as speech recognition result.

Figure 3:
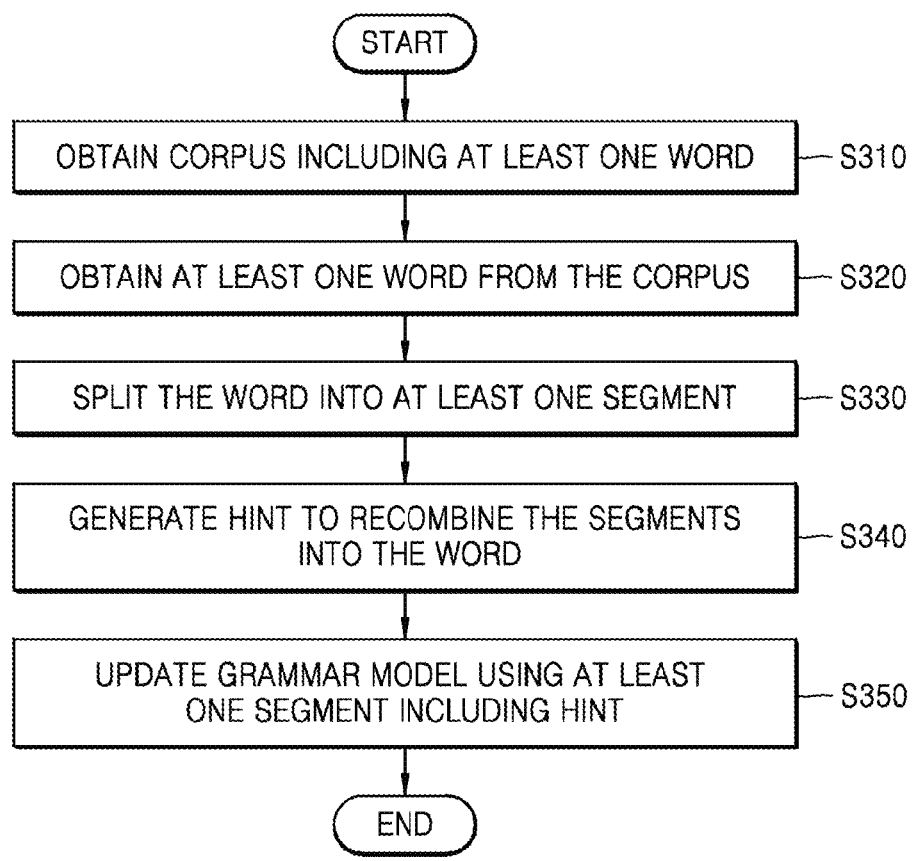
FIG. 3 is a flowchart illustrating an example method of updating a grammar model.

FIG. 3 is a flowchart illustrating an example method of updating a grammar model.

Referring to step S310 in FIG. 3, a device may obtain a corpus including at least one word.

The corpus may include content or texts included in a web page. When the texts are included in an image file, the texts may be obtained by an optical character reader (OCR). The corpus may include text in the form of a sentence or a paragraph including a plurality of words. The device may obtain a word for updating the grammar model 240 from the corpus.

In step S320, the device may obtain at least one word from the corpus obtained in step S310. The word which may be obtained in step S320 may include an OOV word which is not included in the grammar model 240 and thus cannot be detected by speech recognition.

In step S330, the device may split the word obtained in step S320 into at least one segment. The device may determine a splitting sequence based on an appearance frequency or a length of the word or the segment. As long word sequences having a low appearance frequency may have a form in which a plurality of words often used are collected with a higher possibility, the device may preferentially split the long word sequences having a low appearance frequency. Furthermore, the device may determine a splitting point based on an appearance frequency of segments. A word splitting method that may be used in step S330 will be described in more detail below with reference to FIGS. 4 to 6.

The device may split a word until the number of segments or words capable of being added to the grammar model 240 reaches a prescribed number or more by considering a size of the grammar model 240.

Furthermore, the device may split the word obtained in step S320 using segments generated in step S330 after finishing the splitting in step S330. The device may identify a word including the already generated segments from among the words obtained in step S320 and may split the word. The device may split the word so as not to generate a new segment due to the splitting. For example, the segments already generated in step S330 may be generated without generating a new segment due to the splitting.

In step S340, the device may generate a hint to recombine the segments into the word after finishing the splitting in step S330. The generated hint may be added to a grammar model with the segments. The hint for recombining the segments into the word may be determined based on whether there are spaces in the word before being split. When speech recognition is performed, spaces may be added between the segments based on the hint of the segments.

For example, respectively different hints may be presented in both ends of the segments based on whether each segment is located at a boundary of the word in an original word before being split or is split from inside the word.

If the original word is 'SunsetLaneElementarySchool', a segment presenting a hint may be generated as '_Sunset-Lane+Elementary+School_'. 'elementaryschoolcurriculum' may have a segment generated as '_elementary+school+curriculum_' by splitting. 'I went to school' may have a segment generated as '_I_+_went_+_to_+_school_' by splitting. 'school' may have a segment generated as '_school_' by splitting.

Like the above example, when a segment is located at a boundary of the original word, it is possible to put a special symbol on the segment located in the boundary of the original word in order to present the boundary of the word. Therefore, when the hint is presented according to the above method, four segments including an identical segment or different hints such as '_s', 's_', '_s_', 's' may be generated. Each segment may be added to the grammar model 240 as a value having respective appearance probability information.

In step S350, the device may update a grammar model using at least one segment including a hint. The grammar model may be updated based on appearance probability information of each segment. In the example of a segment already included in the grammar model, appearance probability information of the segment may be updated. In the example of a segment not included in the grammar model, appearance probability information of the segment may be newly added to the grammar model. The appearance probability information of the segment may be determined based on the appearance probability information included in the grammar model and words included in a corpus.

Figure 4:
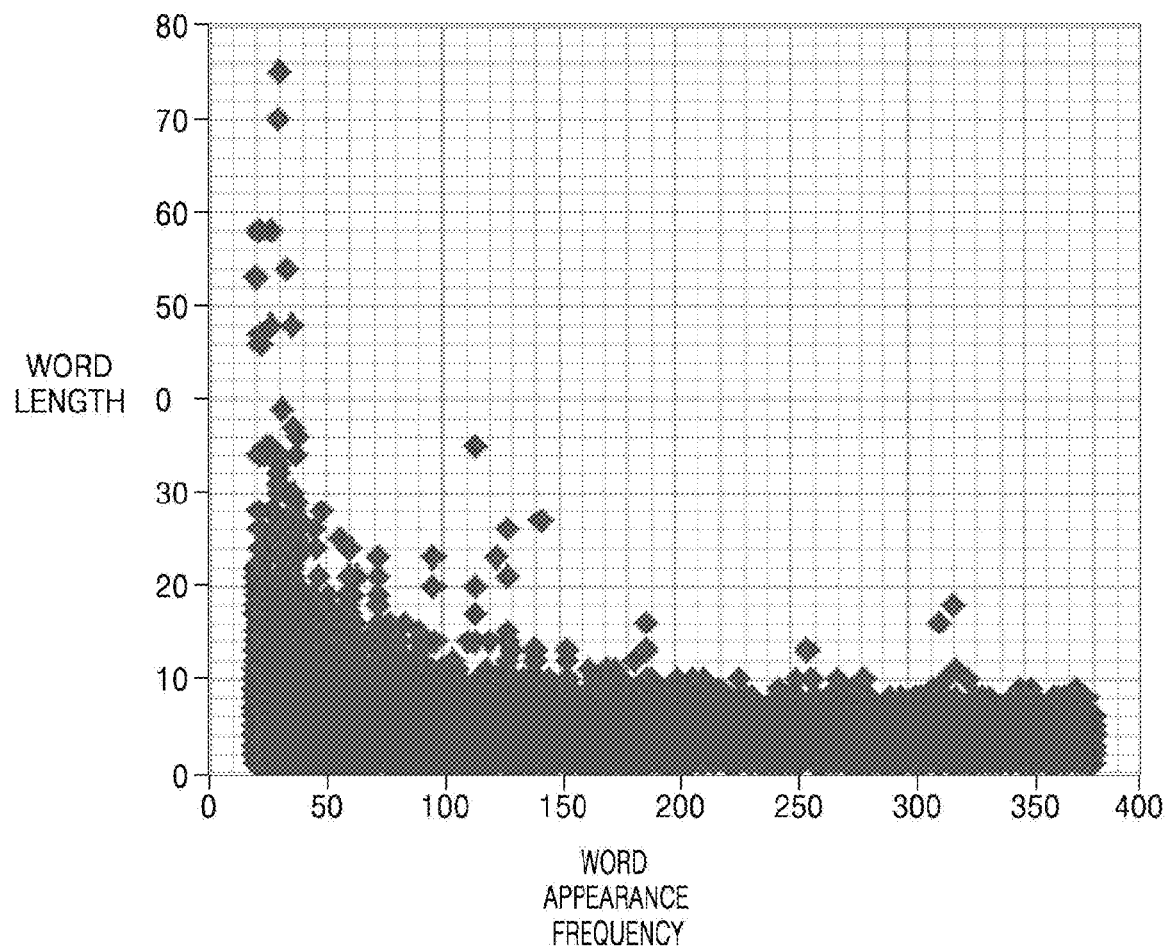
FIG. 4 is a graph illustrating an example of a word according to a word appearance frequency and a word length.

FIG. 4 is a graph illustrating an example of a word based on a word appearance frequency and a word length.

Referring to FIG. 4, words used for generating words included in a corpus or the grammar model 240 may be illustrated as a two-dimensional graph based on an appearance frequency and a length of the words. The words may include text capable of being distinguished based on spaces. As described above, long word sequences mainly have a low appearance frequency and short word sequences mainly have a high appearance frequency.

In general, a long word sequence is composed of at least two meaningful words such as 'noun+noun' or 'noun+ postpositional particle'. Therefore, a short word sequence may be added to the grammar model 240 as it is, without being split by preferentially splitting a long word sequence by a device. Therefore, a device for updating a grammar model may minimize the number of words or segments added to the grammar model 240 while minimizing OOV words included in a corpus.

Figure 5:
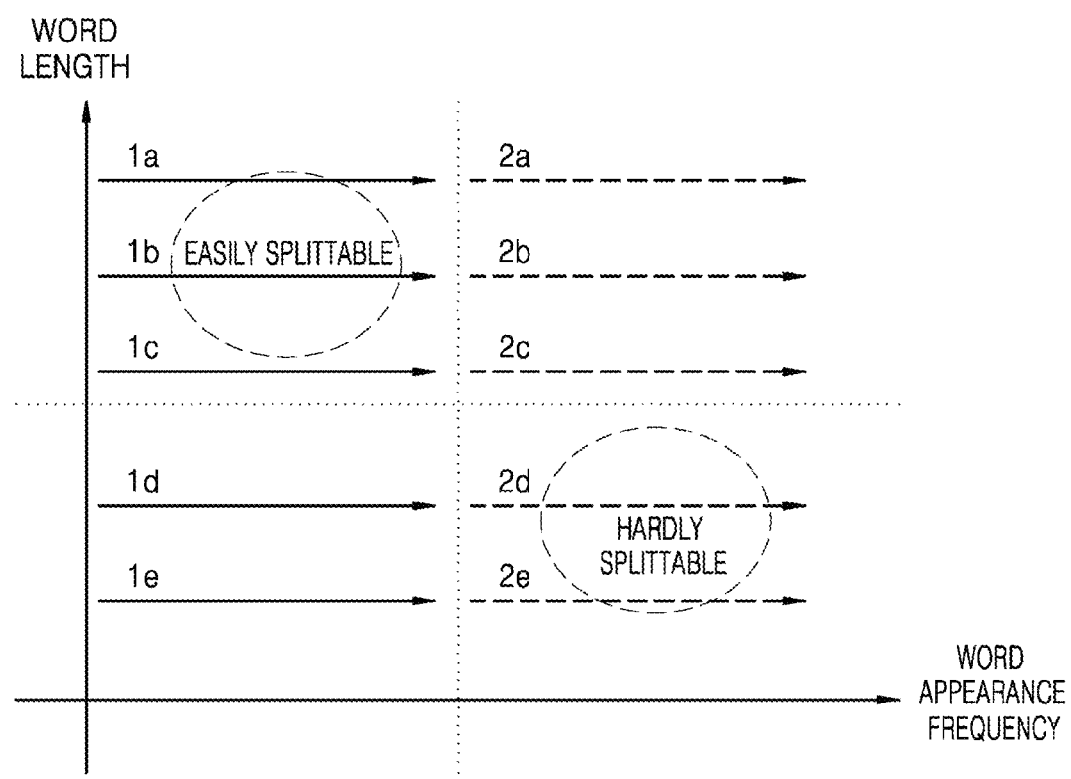
FIG. 5 is a graph illustrating an example word split sequence.

FIG. 5 is a graph illustrating an example of a word split sequence.

Referring to FIG. 5, a long word sequence having a lower appearance frequency may preferentially split. The word having a low appearance frequency may sequentially split in a sequence of from 1a to 1e in a direction that decreases a length the word. Furthermore, a word having a high appearance frequency may also be sequentially split in a sequence of from 2a to 2e in a direction that decreases a length the word. A short word sequence having a higher appearance frequency may have a higher possibility to be added to the grammar model 240 without being split.

FIG. 6 is a graph illustrating an example of word splitting.

Referring to FIG. 6, a word sequence for 'channelat' may split as illustrated in FIG. 6. The word 'channelat', may be split into various units, but will be described below based on splitting into syllable units.

The word 'channelat' may be referred to as one word sequence as not including spaces and may include three splitting methods when the word is split into syllable units. A device for updating a grammar model may obtain a segment appearance probability according to each splitting method as in block 610.

In block 610, f(s) represents an appearance probability of segment s capable of appearing in a word head. Furthermore, t(s) represents an appearance probability of segment s capable of appearing in a word tail. The above-mentioned words may represent a word capable of being recognized by a device performing speech recognition and words included in a corpus.

In block 620, scores may be determined based on an appearance probability of each segment with respect to methods of splitting 0, 1, and 2. The word 'channelat' may be split into 'channel' and 'at' based on the method of splitting 1 as a score of the method of splitting 1 is the highest.

The more often preceding and following segments are changed in a portion on the basis of a splitting point, the higher the score of a corresponding splitting method may be determined. Meanwhile, when the preceding and following segments are often connected without spaces on the basis of the splitting point, a score of corresponding splitting method may be determined as low.

The device updating the grammar model may split a word based on a corresponding splitting method when the score is a reference value or more. When the score is a reference value or less, it is preferable not to split a word according to a corresponding splitting method as segments based on the corresponding splitting method may not often appear in a split state.

In block 630, a score of the method of splitting 1 may be determined. Based on the method of splitting 1, the score may be determined based on an appearance probability value of each segment 'channel' and 'at'. The appearance probability value of each segment may be determined under the condition that 'channela' and 'cha' appear in the word head and under the condition that 'at' and 't' appear in the word tail The score in block 630 may be obtained by various methods without being limited to the above method. The score may be determined based on the appearance probability value of each segment according to each splitting method.

Hereinafter, a word splitting method will be described according to an example embodiment.

In a case of splitting word sequence for 'JohnSmith cellphone', segments may be split into 'John+Smith+cellphone'. The segments may split based on spaces as the spaces are included in the word. 'JohnSmith' may be split into 'John+Smith' based on a score determined based on each splitting method.

Furthermore, a word sequence for 'SantaBarbara Pier' may be split into 'Santa+Bar+ba+ra+Pier'.

Furthermore, a word sequence for 'Ellui Theatre Hollywood' may be split into 'El+lui+Theatre+Hollywood'.

Furthermore, a word sequence for 'What tikitz doyouhavenow' may be split into 'What+tiketz+do+you+have+ now'.

Furthermore, a word sequence for 'CanIhavemyparceldiliberedonaMonday' may be split into 'Can+I+have+my+ parcel+dilibered+on+a+Monday'.

Furthermore, a word sequence for 'Where canIbuy Samsungelectronics oops products' may be split into 'Where+ can+I+buy+Samsung electronics+oops+products'.

The above-mentioned examples include texts in a colloquial style or in atypical can be seen often in web text. Although often used words such as 'cellphone', 'Samsungelectronics' are not split, words having a low appearance frequency such as 'Ellui+Theatre' or 'Santa+Bar+ba+ra+ Pier' may be split into shorter segments having a higher appearance frequency. For example, even when misspelled words such as 'Samsungelectronics+oops+products', 'dilibered', or 'What tikitz' are included in the text, surrounding segments may be suitably split.

Each of the split segments may be split into smaller units having meanings in itself such as a prefix, a suffix, or a postpositional particle. However, the smaller units may not split into much smaller units of segment since many of much smaller units of language included in one of the split segments may be included in different segments.

In an example embodiment, each segment split from a word has enough appearance frequency; therefore, it may be more favorable to detect a new word from speech sound by combining segments while performing speech recognition on the new word.

Hereinafter, a method of performing speech recognition according to an example embodiment will be described in more detail below with reference to FIG. 7.

Figure 7:
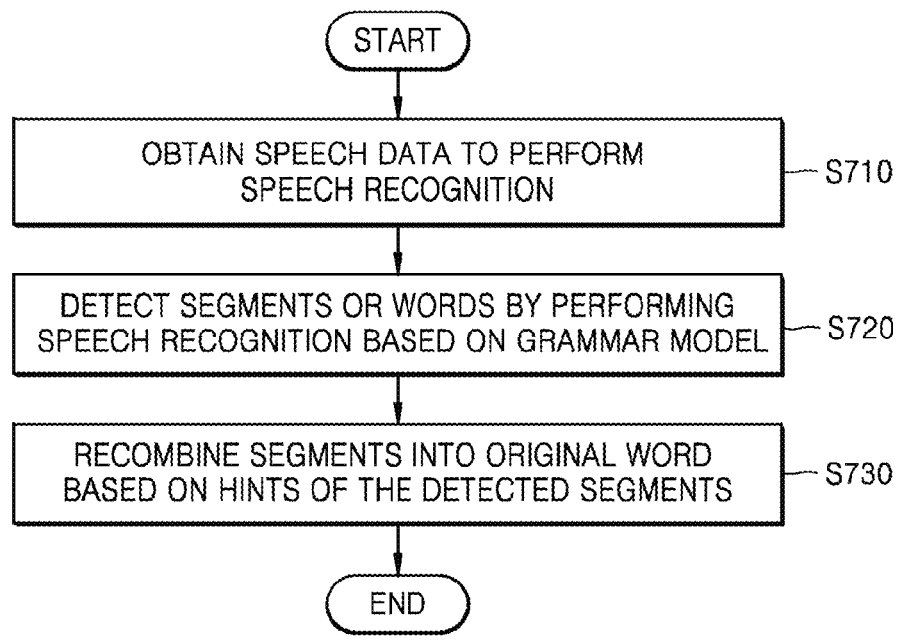
FIG. 7 is a flowchart illustrating an example method of performing speech recognition.

FIG. 7 is a flowchart illustrating an example method of performing speech recognition.

Referring to FIG. 7, a device performing speech recognition may obtain speech data to perform speech recognition in step S710. The speech data may include speech sound including human voice.

In step S720, the device may detect segments or words by performing speech recognition based on the grammar model 240. For example, the device may obtain a pronunciation variant corresponding to speech data and may obtain segments or words corresponding to the pronunciation variant based on a pronunciation dictionary. Furthermore, the device may detect segments or words having a high appearance probability value based on the grammar model 240, from among the segments or the words obtained based on the pronunciation dictionary.

In step S730, the device may recombine the segments into the original word based on hints of the segments detected in step S720. For example, a segment detected in step S720 may be a segment having the highest appearance probability information. The device may add spaces between segments by using the hints of the detected segments.

As described above, when '_' mark is added to a segment located at a boundary of the word, the device may add spaces when the '_' mark continuously appears twice.

For example, in the case of 'SunsetLane_+ Elementary+_School', the device may recombine the word into 'SunsetLaneElementarySchool'. A word for 'elementary_+school_+_curriculum' may be recombined into 'elementaryschool curriculum' since continuously having '_' mark twice between 'school' and 'curriculum'. A word for '_I+went_+_to+school_' may be recombined into 'Iwent toschool' since continuously having '_' mark twice between 'went' and 'to'.

Hereinafter, a method of updating speech data by detecting an OOV word using words included in the speech data and performing speech recognition using the updated speech data will be described in more detail below with reference to FIGS. 8 to 13.

Figure 8:
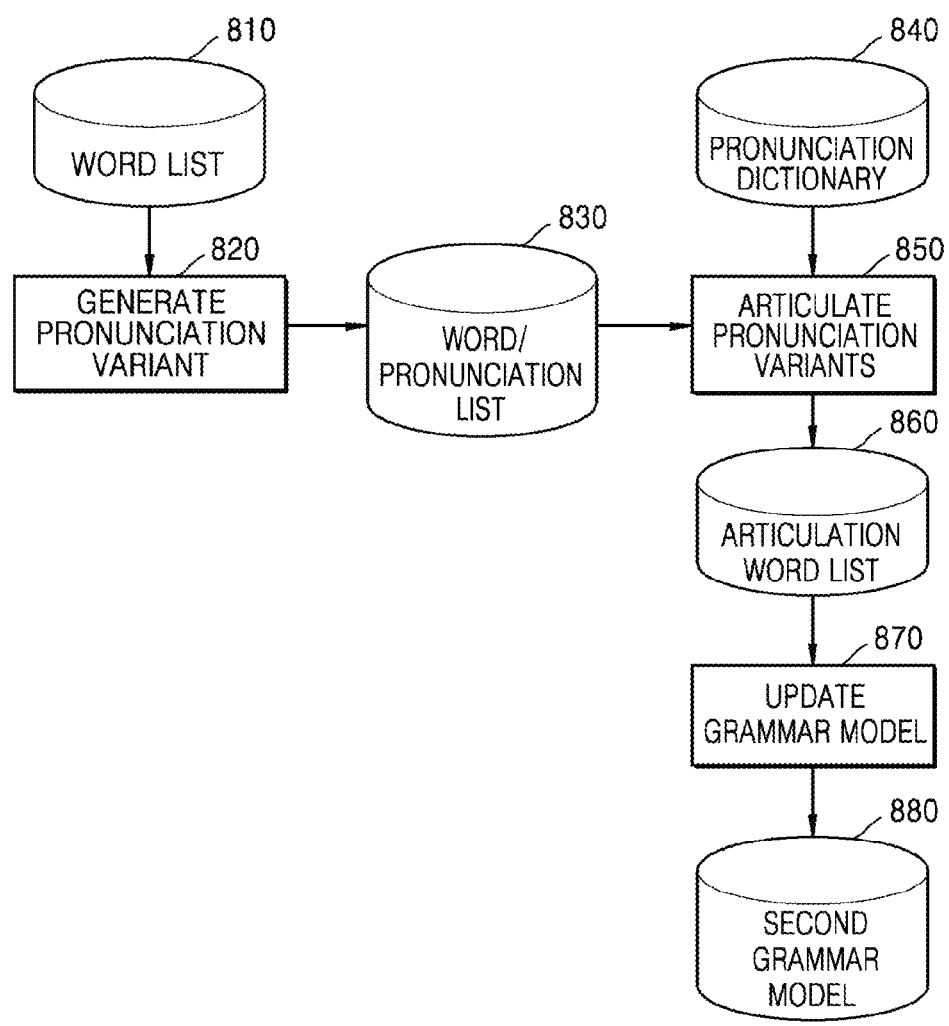
FIG. 8 is a diagram illustrating an example of a process of detecting an out of vocabulary (OOV) word from among words included in speech data and updating a grammar model based on the detected OOV word.

FIG. 8 is a diagram illustrating an example process of detecting an OOV word from among words included in speech data and updating a grammar model based on the detected OOV word.

Referring to FIG. 8, a word list 810 may include an OOV word obtained from a corpus. A device updating speech data may generate a pronunciation variant of the OOV word included in the word list 810, in block 820. The device may generate the pronunciation variant of the OOV word based on, for example, an N-best search algorithm. However, the device is not limited thereto and may generate the pronunciation variant of the OOV word by using various methods. A plurality of pronunciation variants of an OOV word may also be generated according to an example embodiment.

The device may generate a word/pronunciation list 830 by corresponding the pronunciation variant of the OOV word generated in block 820 to the OOV word. Furthermore, the device may articulate pronunciation variants of an OOV word included in the word/pronunciation list 830 using a pronunciation dictionary 840 including pronunciation variants of words capable of performing speech recognition, in block 850. The device may articulate the pronunciation variants of the OOV word with the pronunciation variants included in the pronunciation dictionary 840. The pronunciation dictionary 840 may correspond to the pronunciation dictionary 150 of FIG. 1; however, the example embodiment is not limited thereto and the pronunciation dictionary 840 may include various types of data including existing pronunciation variants of words.

As a second grammar model is updated based on the existing pronunciation variants of words, speech recognition may be performed on the OOV word based not on the existing pronunciation variants, but a new pronunciation variant. Therefore, the OOV word may be detected with a further higher accuracy during speech recognition.

The device may generate an articulation word list 860 including pronunciation variants of an OOV word articulated in block 850. The articulation word list 860 may include a plurality of pronunciation variants articulated according to different articulation methods with respect one OOV word.

Different scores may be assigned corresponding to each pronunciation variant, based on articulation methods or words included in each pronunciation variant. For example, a much higher score may be assigned corresponding to a pronunciation variant articulated based on a specified word such as a postpositional particle. Furthermore, a much higher score may be assigned corresponding to a pronunciation variant including a prescribed word. Appearance probability information of a pronunciation variant added to the second grammar model according to the assigned score. For example, an appearance probability value of a pronunciation variant may be determined proportional to the score.

In block 870, the device may determine the appearance probability information corresponding to each articulated pronunciation variant of the articulation word list 860 and may update a second grammar model 880 using a pronunciation variant including the determined appearance probability information. The second grammar model 880 may further include the appearance probability information of each articulated pronunciation variant of the articulation word list 860.

Hereinafter, the method of updating the grammar model of FIG. 8 will be described in more detail below, with reference to FIG. 9.

Figure 9:
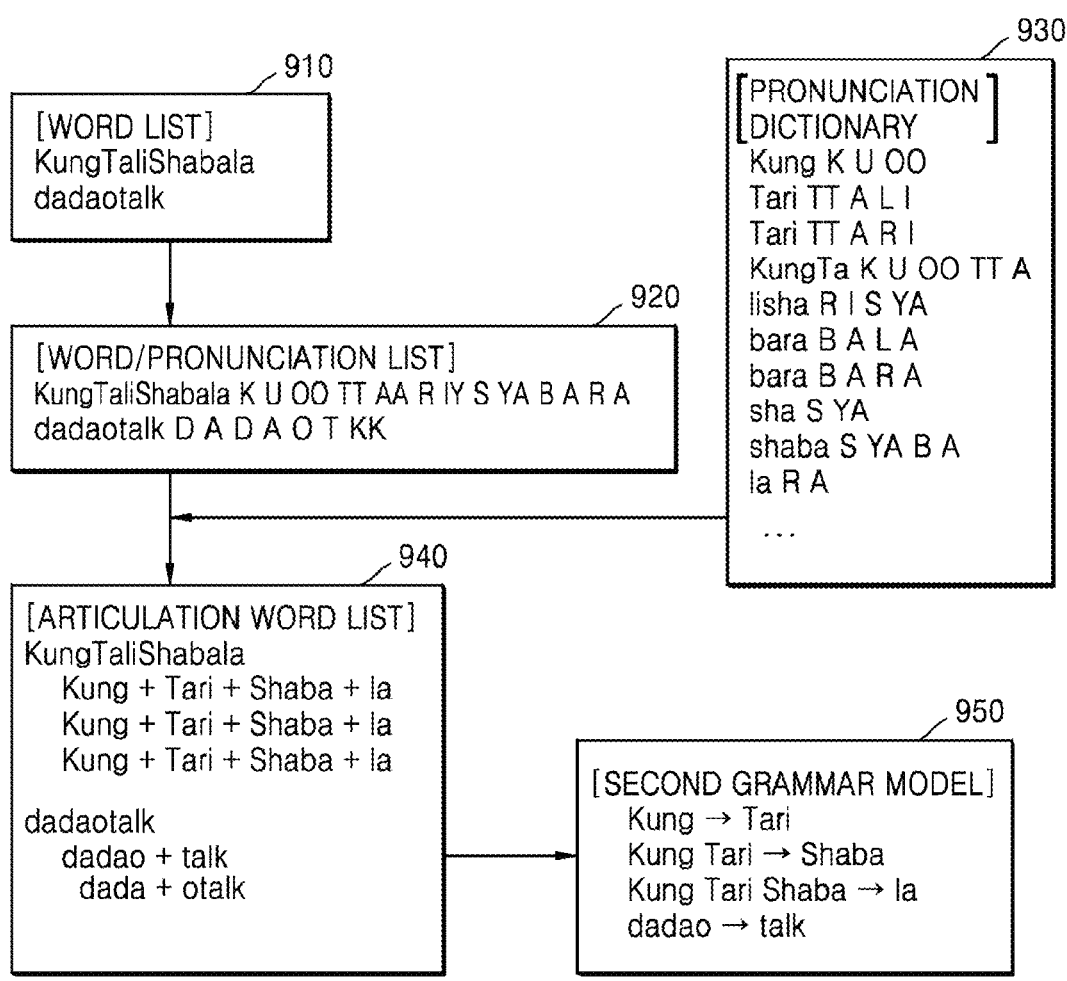
FIG. 9 a flowchart illustrating an example method of updating a grammar model.

FIG. 9 a flowchart illustrating an example method of updating a grammar model.

Referring to FIG. 9, a word list in block 910 may include an OOV word obtained from a corpus. The device may generate a word/pronunciation list including a pronunciation variant of the OOV word based on a pronunciation variant generation process as illustrated in block 920.

In block 920, 'KungTaliShabala' is an OOV word, 'K U OO TT AA R IY S YA B A R A' is a pronunciation variant of the OOV word. Furthermore, 'D A D A O T O KK' is a pronunciation variant of 'dadao talk'. A plurality of pronunciation variants may also exist according to an example embodiment.

Block 930 illustrates an example of a previously established pronunciation dictionary. The pronunciation dictionary may include pronunciation variants of words capable of being detected by speech recognition.

Block 940 illustrates an example of an articulation word list. The articulation word list may include an articulation word variant, which may be a reconfiguration of a pronunciation variant of an OOV word with words included in a pronunciation dictionary 930. The articulation word variant may be obtained by comparing a pronunciation variant of the pronunciation dictionary 930 with the pronunciation variant of the OOV word.

Since 'K U OO' in the pronunciation variant of 'KungTaliShabala' is identical to 'K U OO' in the pronunciation dictionary, 'Kung' of 'K U OO' may be included in the articulation word variant. Since 'K U OO TT AA' is identical to a pronunciation variant of 'KungTa' in the pronunciation dictionary, 'KungTa' may be included in the articulation word variant. Similarly, an identical word, in the pronunciation variant of the OOV word, to a pronunciation variant of the pronunciation dictionary may be included in the articulation word variant.

Block 950 illustrates an example of a second grammar model capable of being updated based on the articulation word list. Referring to block 950, the second grammar model may respectively include information about a probability of appearing 'Tari' after 'Kung', information about a probability of appearing 'Shaba' after 'KungTari', information about a probability of appearing 'la' after 'KungTariShaba', and information about a probability of appearing 'talk' after 'Dadao'. The second grammar model may be updated based on an articulation word variant of the articulation word list.

The second grammar model may be used by a method of obtaining a weighted sum with the previously used first grammar model or the above-mentioned grammar models 160 and 240. For example, appearance probability information about one word may be determined by a weighted sum of appearance probability information obtained from the second grammar model and appearance probability information obtained from the first grammar model or the grammar models 160 and 240. However, the example embodiment is not limited thereto and the second grammar model generated or updated by the above-mentioned method may be used for performing speech recognition by various methods.

Figure 10:
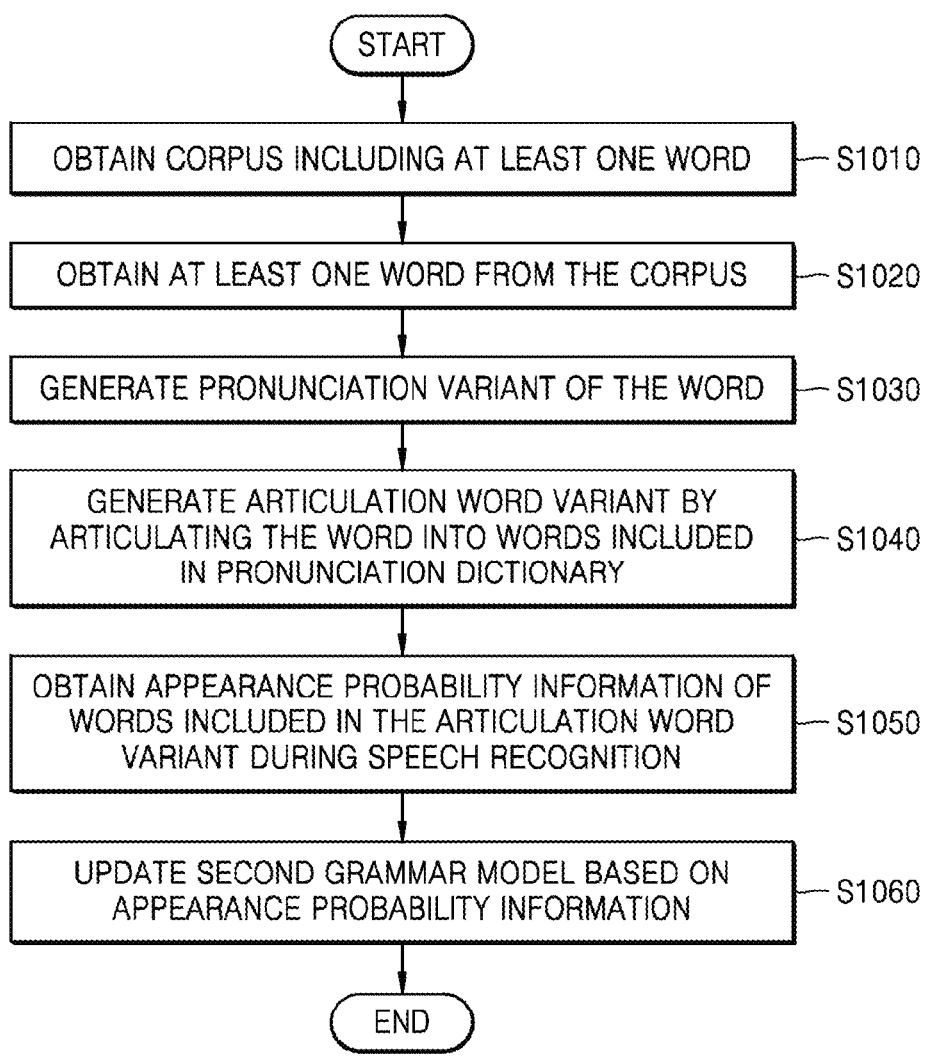
FIG. 10 is a flowchart illustrating an example method of updating a second grammar model.

FIG. 10 is a flowchart illustrating an example method of updating a second grammar model.

Referring to FIG. 10, in step S1010, a device updating grammar model may obtain a corpus including at least one word. In step S1020, the device may obtain at least one word from the corpus. For example, the device may obtain an OOV word that is a word that cannot be detected from the corpus during speech recognition.

In step S1030, the device may generate a pronunciation variant of the word obtained in step S1020. The pronunciation variant may be generated by a method of generating a pronunciation variant from text.

In step S1040, the device may generate an articulation word variant by articulating the word obtained in step S1020 into words included in a pronunciation dictionary based on the pronunciation variant generated in step S1030 and a pronunciation variant included in the pronunciation dictionary. The device may generate an articulation word variant by comparing a pronunciation variant of the word obtained from the corpus with the pronunciation variant of the pronunciation dictionary. The articulation word variant may be configured with words included in the pronunciation dictionary.

In step S1050, the device may obtain appearance probability information of words included in the articulation word variant during speech recognition. The device may obtain appearance probability information of each word from the articulation word variant generated in step S1040.

In step S1060, the device may update the second grammar model based on appearance probability information obtained in step S1050.

Hereinafter, the method of performing speech recognition based on the speech data updated according to the method described in FIGS. 8 to 10 will be described in more detail below, with reference to FIGS. 11 to 13.

Figure 11:
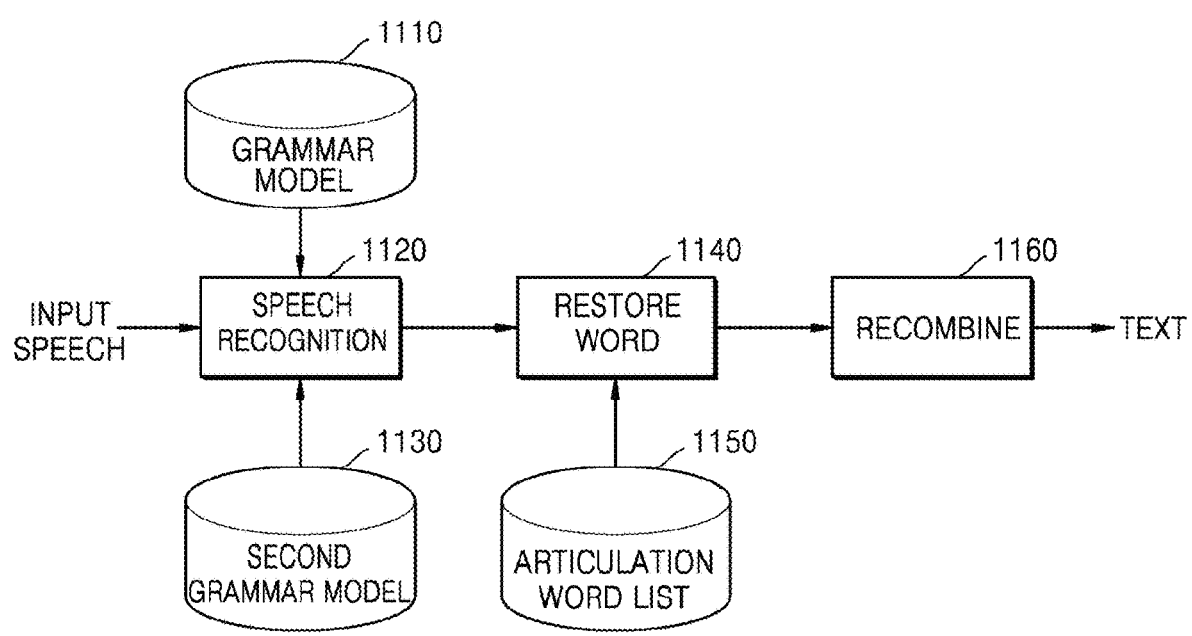
FIG. 11 is a diagram illustrating an example process of performing speech recognition.

FIG. 11 is a diagram illustrating an example process of performing speech recognition.

Referring to FIG. 11, a device performing speech recognition may perform speech recognition using a grammar model 1110 and a second grammar model 1130, in block 1120. The grammar model 1110 may include the above-mentioned grammar models 160 and 240. The second grammar model 1130 may include the above-mentioned second grammar model 880. The device may obtain a word corresponding to input speech by performing speech recognition in block 1120.

The device may restore a word obtained from the second grammar model 1130 using an articulation word list 1150, in block 1140. The second language model includes appearance probability information of a word included in a pronunciation dictionary instead of a word obtained from a corpus. Therefore, the device may restore a word that is recognized as the original word obtained from the corpus by using the articulation word list 1150 including the original word of an articulation word variant.

In block 1160, the device may output text as a result of recombining the restored word and performing speech recognition. For example, when the restored word includes a hint like a segment including the above-mentioned hint (refer to S340), the device may recombine the restored word based on the hint as in the recombination method described above.

Figure 12:
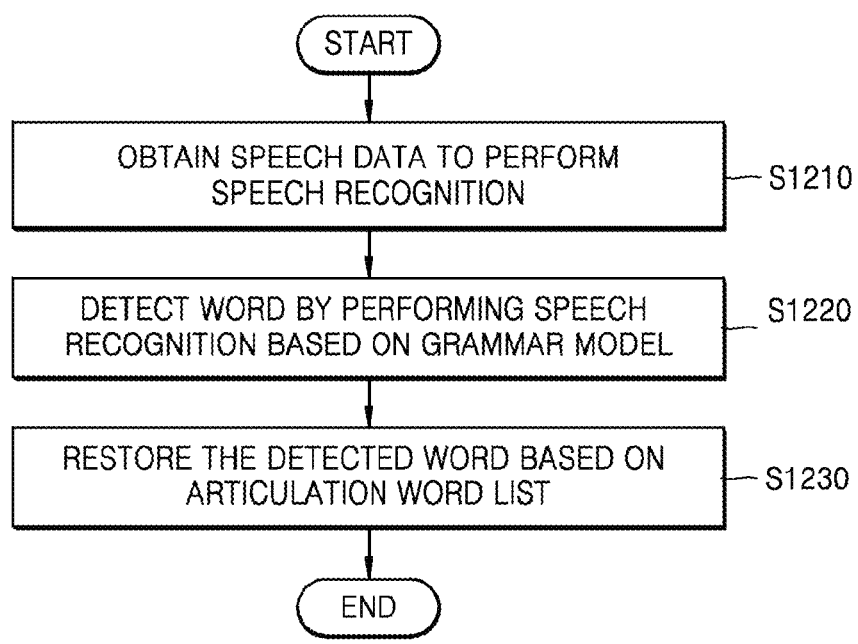
FIG. 12 is a flowchart illustrating an example method of performing speech recognition.

FIG. 12 is a flowchart illustrating an example method of performing speech recognition.

Referring to FIG. 12, in step S1210, a device may obtain speech data to perform speech recognition. Furthermore, the device may detect at least one candidate pronunciation variant corresponding to speech data. The device may detect the candidate pronunciation variant by using the above-mentioned acoustic model 130.

In step S1220, the device may detect a word corresponding to speech data by performing speech recognition, based on a grammar model including the above-mentioned second grammar model. Since the word detected by speech recognition based on the second grammar model corresponds to an existing word in a pronunciation dictionary but the original word, the detected word may be restored to the original word in step S1230.

In step S1230, the device may restore the detected word based on the second grammar model to the original word obtained from a corpus, based on an articulation word list.

Figure 13:
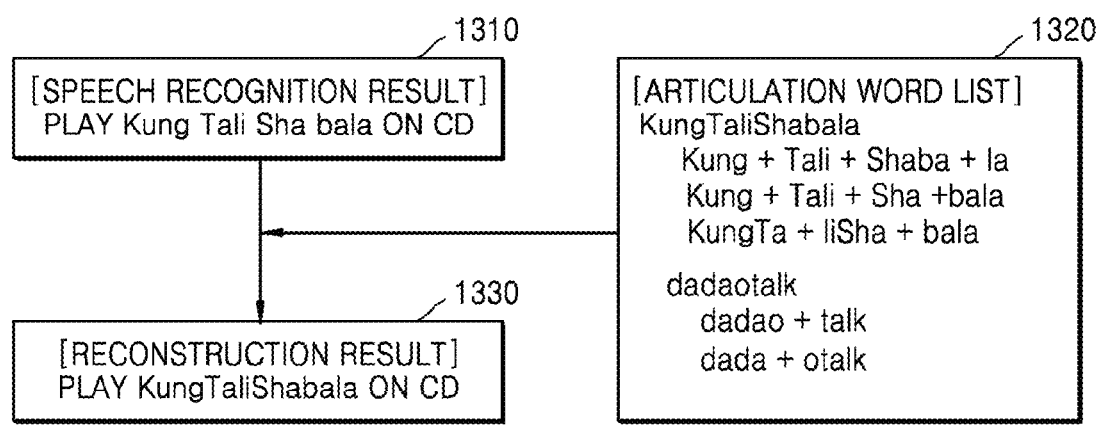
FIG. 13 is a diagram illustrating an example process of performing speech recognition.

FIG. 13 is a diagram illustrating an example process of performing speech recognition.

Referring to FIG. 13, the device may obtain words, as described in block 1310, as speech recognition result based on a grammar model including a second grammar model.

The device may detect the same word as an articulation word variant from among words included in the speech recognition result 1310 with reference to an articulation word list 1320, and may restore the detected word to the original word.

For example, 'Kung Tari Sha bara' in the speech recognition result 1310 is the same as 'Kung+Tari+Sha+bara' in the articulation word list 1320. Therefore, in block 1330, 'Kung Tari Sha bara' may be restored to 'Kung+Tari+Sha+bara' which is the original word corresponding to 'KungTal-iShabala'.

Hereinafter, a method of performing speech recognition in a fixed order of words will be described in greater detail below, with reference to FIGS. 14 to 16.

Figure 14:
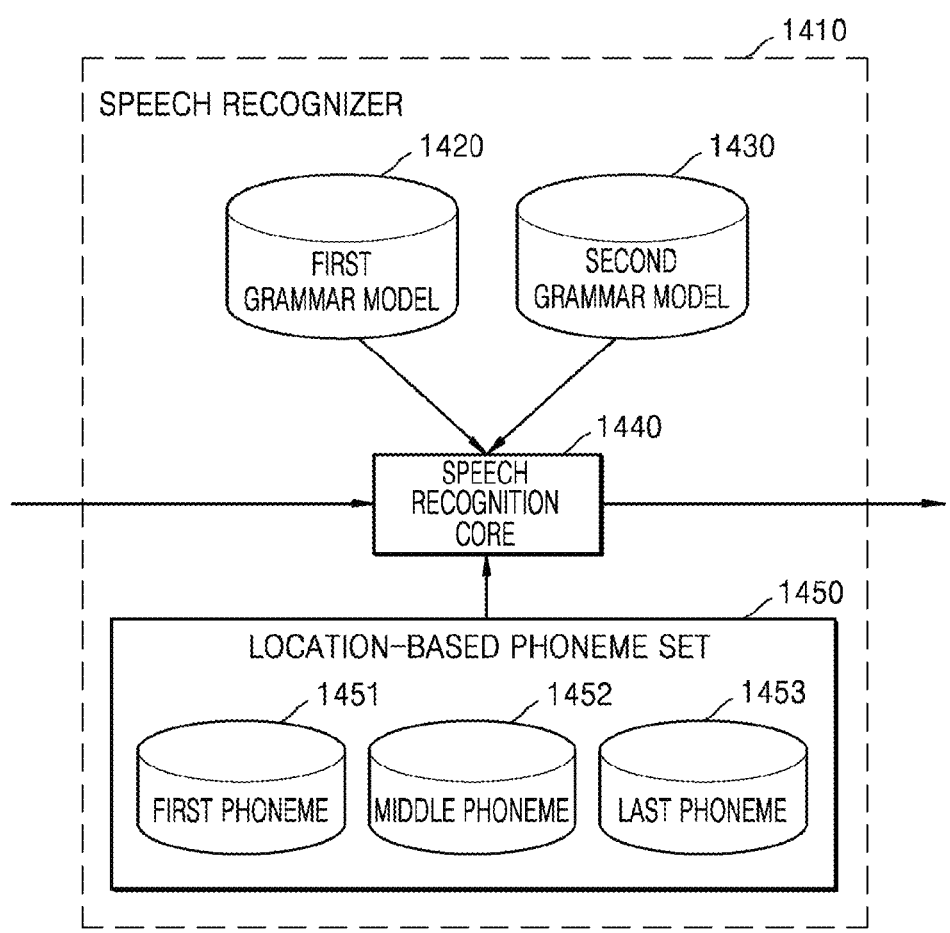
FIG. 14 is a block diagram illustrating an example internal configuration of a speech recognizer.

FIG. 14 is a block diagram illustrating an example of an internal configuration of a speech recognizer 1410.

The speech recognizer 1410 may be included in a device performing the above-mentioned speech recognition. Referring to FIG. 14, the speech recognizer 1410 may include a first grammar model 1420, a second grammar model 1430, speech recognition core 1440, and a location-based phoneme set 1450.

The first grammar model 1420 may include the above-mentioned grammar models 160 and 240; however, the example embodiment is not limited thereto and may include various grammar models capable of being used during speech recognition.

The second grammar model 1430 includes appearance probability information that is adjusted so as to perform speech recognition on phonemes or words in a prescribed sequence.

In Korean, a first phoneme, second and last phonemes may be determined as a consonant or a vowel. For example, first and last phonemes may be determined as a consonant and a second phoneme may be determined as a vowel. It is not preferable to determine a second phoneme as a consonant while determine a first phoneme as a consonant since it is impossible to constitute a language. Therefore, a speech recognizer 1400 according to an example embodiment may perform speech recognition so that phonemes may be detected in a prescribed sequence, with reference to the second grammar model 1430.

However, the speech recognizer 1400 according to an example embodiment may perform speech recognition on not just phonemes but also words and syllables in a prescribed sequence. When a certain word or syllable is detected during speech recognition, speech recognition may be performed in order to detect a prescribed word or syllable with respect to the next speech data. The speech recognizer 1400 may perform speech recognition by using the second grammar model 1430 including an appearance probability value adjusted so as to perform speech recognition on words or syllables in a prescribed sequence. If a sequence of words or syllables is important, the speech recognizer 1400 may perform speech recognition by using the second grammar model 1430 instead of the first grammar model 1420 so as to perform speech recognition on words or syllables in the prescribed sequence.

The speech recognition core 1440 may perform speech recognition on speech sound input using the first and second grammar models 1420 and 1430. As in the above-mentioned method, an appearance probability value of prescribed word may be determined by obtaining a weighted sum of appearance probability values obtained from the first and second grammar models 1420 and 1430. The speech recognition core 1440 according to an example embodiment, in a general mode, may perform speech recognition by using at least one of the first and second grammar models 1420 and 1430.

Furthermore, the speech recognition core 1440 may perform speech recognition in a sequence mode in which speech recognition may be successively performed on phonemes or words in a prescribed sequence. When being operated in a sequence mode, the speech recognition core 1440 may perform speech recognition by using the second grammar model 1430 including an appearance probability value adjusted so as to perform speech recognition in a sequence.

The location-based phoneme set 1450 may respectively include identification information about phonemes classified into a first phoneme 1451, a middle phoneme 1452, and a last phoneme 1453. The location-based phoneme set 1450 may be used when speech recognition is performed in a sequence of the above-mentioned phonemes.

When the speech recognition core 1440 performs speech recognition in a general mode, if a phoneme classified into the first phoneme 1451 is detected as speech recognition result, the speech recognition core 1440 may perform speech recognition by being converted into a sequence mode. The speech recognition core 1440 may perform speech recognition by using the second grammar model 1430 in the sequence mode.

When the speech recognition core 1440 is operated in the sequence mode, speech recognition may be performed so that a phoneme belonging to the middle phoneme 1452 may be detected corresponding to speech data following the first phoneme 1451. After the middle phoneme 1452 is detected by speech recognition, the speech recognition core 1440 may perform speech recognition so that a phoneme belonging to the last phoneme 1453 may be detected. When the last phoneme 1453 is detected by speech recognition, the speech recognition core 1440 may perform speech recognition again in a general mode.

Although an example of performing speech recognition in a phoneme sequence is described in the example embodiment, the example embodiment is not limited thereto and speech recognition may be performed in a sequence of prescribed words or syllables. Furthermore, first to third phoneme sequences are described in the example embodiment; however, the example embodiment is not limited thereto and speech recognition may be performed in a sequence of a plurality of phonemes.

The speech recognition core 1440 may operate in a sequence mode when detecting a first sequence of words by speech recognition. The speech recognition core 1440 may operate by using the second grammar model 1430 so that speech recognition may be performed on a next sequence of words. For example, the speech recognition core 1440 may detect the next sequence of words following the first sequence of words from a group of words by using the second grammar model 1430. The speech recognition core 1440 may perform speech recognition in a sequence mode until when the last sequence of words is detected. The speech recognition core 1440, when the last sequence of words is detected, may return from the sequence mode to the general mode and may perform speech recognition by using the first and second grammar models 1420 and 1430.

Figure 15:
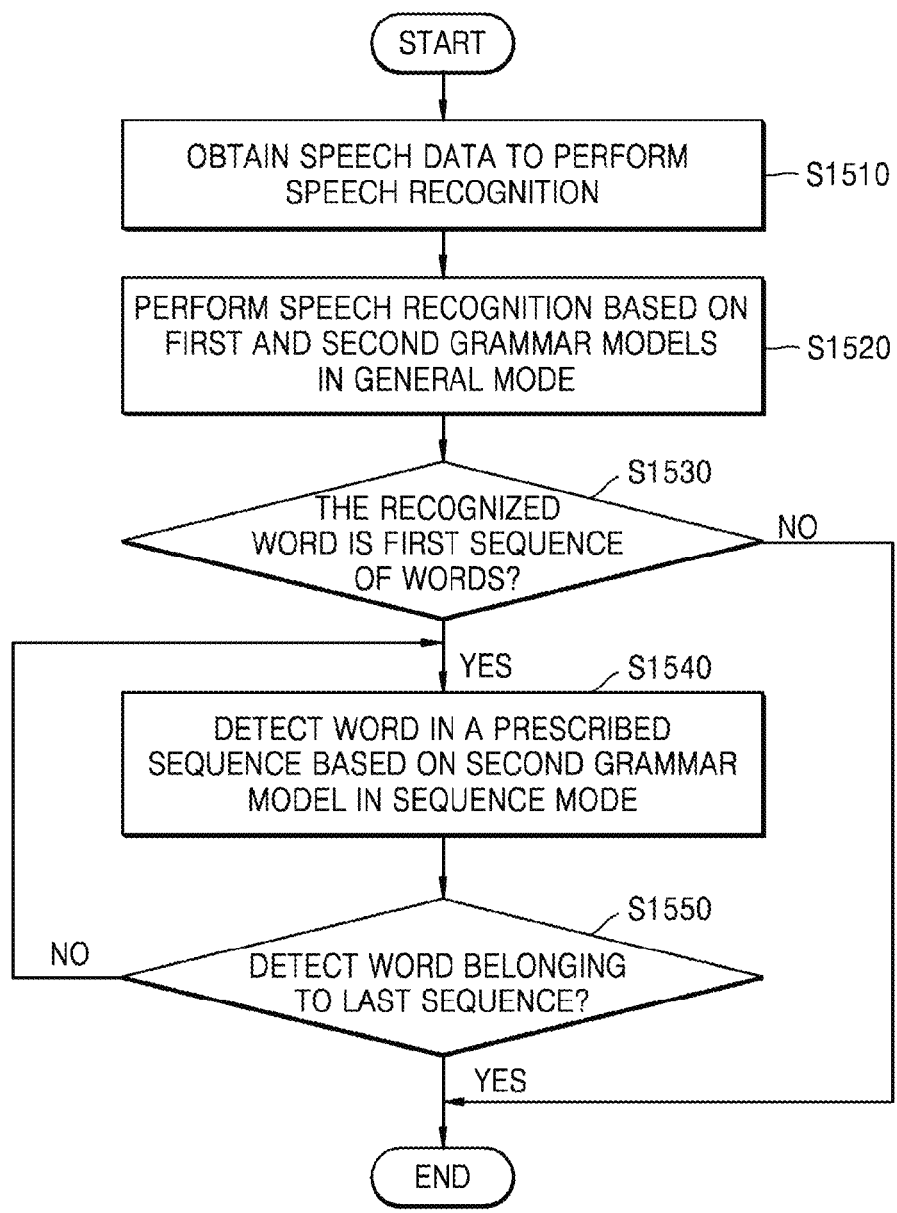
FIG. 15 is a flowchart illustrating an example process of performing speech recognition based on a prescribed word sequence.

FIG. 15 is a flowchart illustrating an example process of performing speech recognition according to a prescribed word sequence.

Referring to FIG. 15, the device performing speech recognition may obtain speech data to perform speech recognition in step S1510.

In step S1520, the device, based on first and second grammar models, may perform speech recognition on the data obtained in step S1510 in a general mode. For example, the device may obtain at least one candidate pronunciation variant corresponding to the speech data. The device may obtain candidate words corresponding to each candidate pronunciation variant. The device may obtain a word corresponding to a pronunciation variant based on the above-mentioned pronunciation dictionary 150. The device, based on the first and second grammar models, may detect one word as speech recognition result based on appearance probability information of words corresponding to respective candidate pronunciation variants.

It will be described that a language capable of being detected by speech recognition is not limited to word units and may be detected in various units such as syllables or phonemes. However, the language will be described as being detected in word units for the sake of convenience.

The first grammar model 1420 may include various grammar models capable of being used during speech recognition. The second grammar model 1430 includes appearance probability information adjusted so as to perform speech recognition on syllables or words in a prescribed sequence. The device may perform speech recognition by obtaining a weighted sum of appearance probability values obtained from the first and second grammar models.

In step S1530, it may be determined whether the recognized word in step S1520 belongs to a word set as a first sequence. A last word is not limited to word units as described above and may include various units of language such as syllables or phonemes.

In step S1540, when the last word belongs to the word set as the first sequence, the device may perform speech recognition in a sequence mode. The device may perform speech recognition so that words may be detected in a prescribed sequence based on the second grammar model. After the word set as the first sequence is detected by speech recognition, the device may detect a word from among words capable of following the word set as the first sequence based on the second grammar model.

In step S1550, the device may perform speech recognition in a sequence mode until when a word belonging to the last sequence is detected as speech recognition result. The device, when the word belonging to the last sequence is detected, may return to the general mode and may perform speech recognition based on the first and second grammar models in step S1520.

Figure 16:
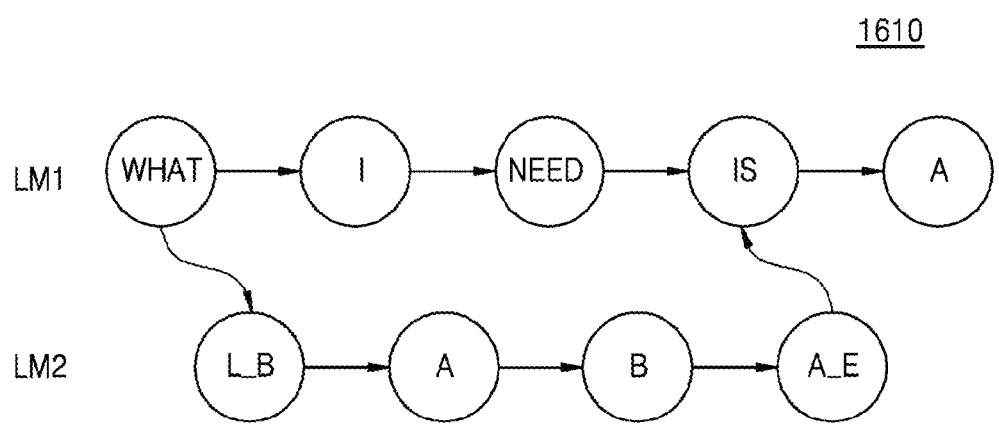
FIG. 16 is a diagram illustrating an example process of performing speech recognition based on a determined sequence.
Figure 16:
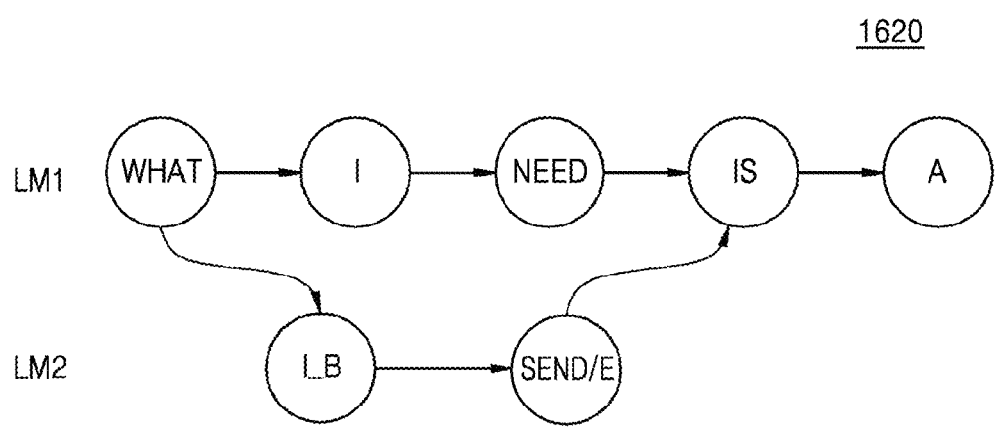

FIG. 16 is a diagram illustrating an example process of performing speech recognition according to a determined sequence.

Referring to step 1610 of FIG. 16, words may be detected as speech recognition result based on respectively different grammar models. 'What', 'I', 'NEED', 'IS', and 'A' may be detected as speech recognition result by a first grammar model LM1 in a general mode. The words may be detected based on a weighted sum of first and second grammar models LM1 and LM2. Furthermore, 'L_B', 'A', 'B', and 'A_E' may be detected as speech recognition result according to the second grammar model LM2 in a sequence mode. 'L_B', 'A', 'B', and 'A_E' are written as symbols of the words, phonemes, and syllables. '_B' represents being designated as a first sequence and '_E' represents being designated as a last sequence.

When 'L_B' designated as the first sequence is detected after a word for 'What' is detected in a general mode, a device may perform speech recognition according to the second grammar model LM2 in a sequence mode. 'A' and 'B' may be detected as speech recognition result according to a determined sequence, after 'L_B' is detected. For example, 'A' and 'B' may be one of words capable of being detected as second and third sequences, respectively. The device may perform speech recognition by returning from the sequence mode to the general mode when 'A_E' is detected.

Referring to step 1620 of FIG. 16, words may be detected as speech recognition result based on respectively different grammar models. 'What', 'I', 'NEED', 'IS', and 'A' may be detected as speech recognition result by the first grammar model LM1 in the general mode. The words may also be detected according to the weighted sum of the first and second grammar models LM1 and LM2. Furthermore, 'I_B' and 'SEND/E' may be detected as speech recognition result by the second grammar model LM2 in the sequence mode.

When 'I_B' designated as the first sequence is detected after the word for 'What' is detected in a general mode, the device may perform speech recognition according to the second grammar model LM2 in a sequence mode. 'SEND/E' may be detected as speech recognition result according to a determined sequence, after 'I_B' is detected. For example, 'SEND/E' may be one of words capable of being detected after 'I_B'. The device may perform speech recognition by returning from the sequence mode to the general mode when 'SEND/E' is detected.

Hereinafter, a method of updating a grammar model based on a class to which words belong and performing speech recognition will be described in more detail below with reference to FIGS. 17 to 21.

Figure 17:
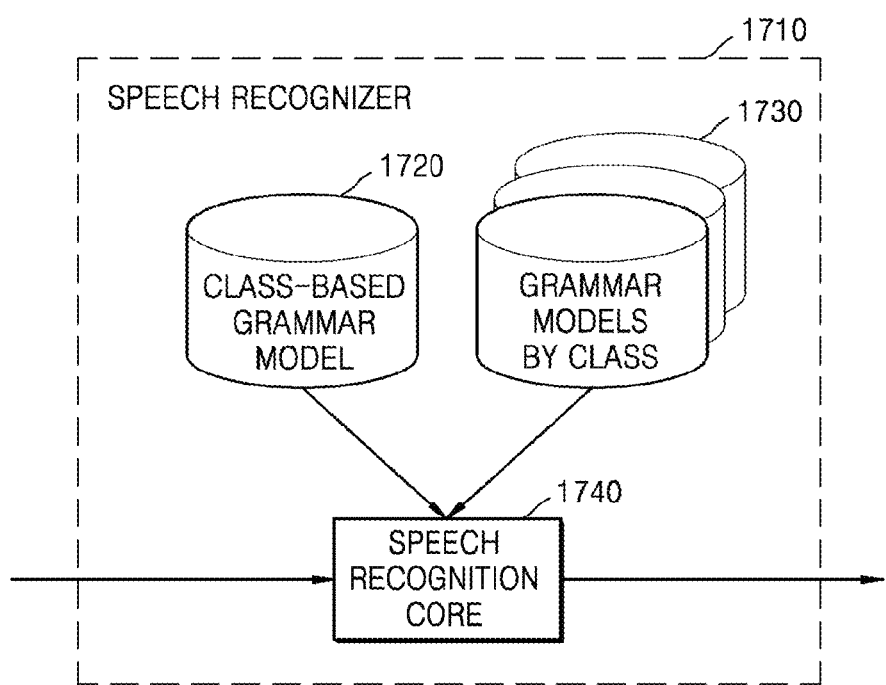
FIG. 17 is a block diagram illustrating an example internal configuration of a speech recognizer performing speech recognition based on a class to which a word belongs.

FIG. 17 is a block diagram illustrating an example internal configuration of a speech recognizer performing speech recognition according to a class to which a word belongs.

A speech recognizer 1710 may be included in a device performing the above-mentioned speech recognition. Referring to FIG. 17, the speech recognizer 1710 may include a class-based grammar model 1720, a grammar models by class 1730, and speech recognition core 1740.

The speech recognition core 1740 may perform speech recognition using the class-based grammar model 1720 and the grammar models by class 1730.

The class-based grammar model 1720 may include appearance probability information of a word including an entry token. When the word including the entry token is detected as speech recognition result, the speech recognition core 1740 is converted from in a general mode to a class recognition mode and may perform speech recognition.

The class-based grammar model 1720 may include various grammar models capable of being used during speech recognition. For example, the class-based grammar model 1720 may include the first and second grammar models 1420 and 1430, and the grammar models 160 and 240 that are above-mentioned.

The grammar models by class 1730 may include grammar models by class respectively existing in each class. The grammar models belonging to respectively different classes may include appearance probability information of a word belonging to corresponding class. When the speech recognition core 1740 is operated in a class recognition mode as the word including the entry token is detected as speech recognition result, the speech recognition core 1740 may perform speech recognition by using the grammar models by class 1730. The speech recognition core 1740, according to a class represented by the entry token, may perform speech recognition using a grammar model belonging to corresponding class. The speech recognition core 1740 may be operated by returning to the general recognition mode when detecting the word including the exit token in the class recognition mode.

A word belonging to the grammar models by class 1730 may include an entry token representing different class. When the word including the entry token representing different class is detected as speech recognition result, speech recognition may be performed based on a grammar model belonging to a class represented by the entry token. For example, the speech recognition core 1740 may perform speech recognition by using a grammar model belonging to a first class in a class recognition mode. When a word including an entry token representing a second class in a class recognition mode, the speech recognition core 1740 may perform speech recognition by using a grammar model belonging to the second class.

Figure 18:
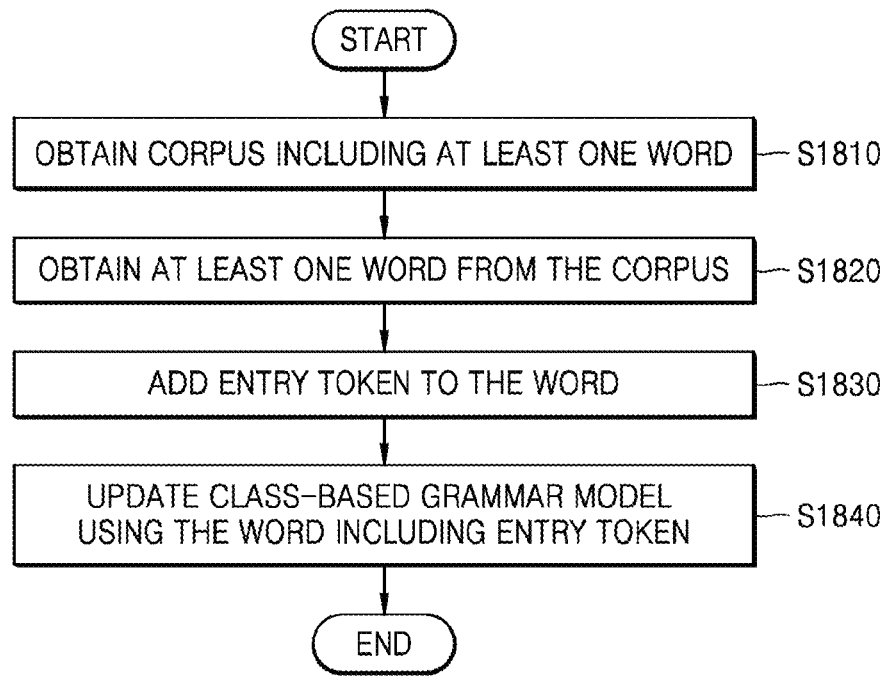
FIG. 18 is flowchart illustrating an example method of updating a class-based grammar model.

FIG. 18 is flowchart illustrating an example method of updating a class-based grammar model.

Referring to FIG. 18, a device for updating a grammar model in step S1810 may obtain a corpus including at least one word. In step S1820, the device may obtain at least one word from the corpus. The word obtained in step S1820 may include an OOV word that is a word that cannot be detected by speech recognition by speech recognition device.

In step S1830, the device may determine whether to add an entry token to the word obtained in step S1820 and may add the entry token to the word based on a result of the determination. For example, the device may update the class-based grammar model 1720 by including the entry token in a prescribed word so that speech recognition may be performed on a word belonging to a prescribed class after the prescribed word.

In step S1840, the device may update the class-based grammar model 1720 using the word including the entry token in step S1830. The device may determine appearance probability information of the word including the entry token and may update the class-based grammar model 1720 by using the determined appearance probability information.

Figure 19:
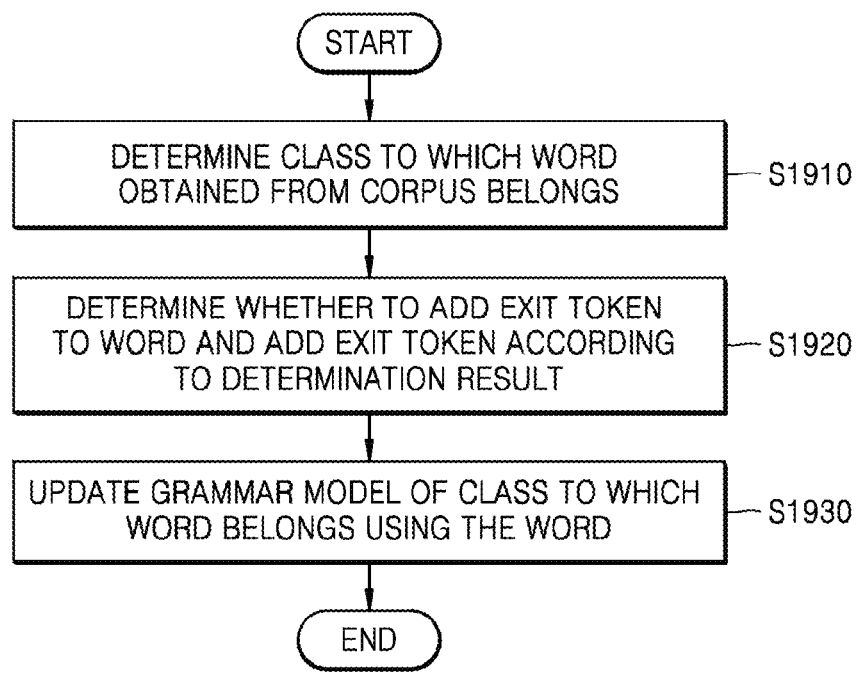
FIG. 19 is flowchart illustrating an example method of updating grammar models by class.

FIG. 19 is flowchart illustrating an example method of updating grammar models by class.

Referring to FIG. 19, a device updating grammar model may determine a class to which a word obtained from a corpus in step S1910 belongs. The word obtained from the corpus may include the above-mentioned OOV word. In step S1910, the device, in a case of a word whose class is not determined, may be used for updating a class-based grammar model based on the method of updating the class-based grammar model in FIG. 18.

In step S1920, the device may determine whether to add an exit token to the word whose class is determined in step S1910, and may add the exit token based on the determination result. For example, the device may determine whether to add the exit token to a word according to a meaning of the word.

In step S1930, the device may update a grammar model of a class to which a word belongs using a word which may include an exit token or not.

Figure 20:
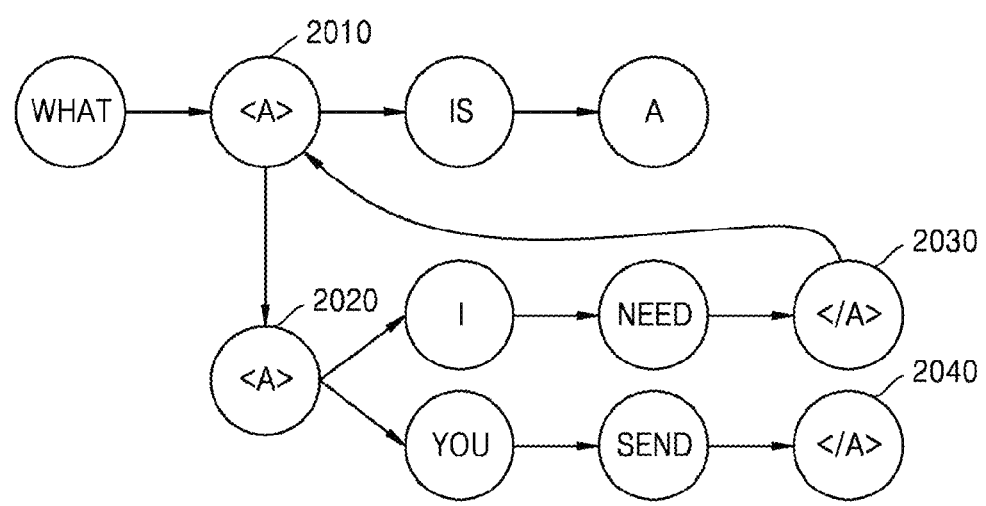
FIG. 20 is a diagram illustrating an example process of performing speech recognition using a class-based grammar model and grammar models by class.

FIG. 20 is a diagram illustrating an example process of performing speech recognition using a class-based grammar model and grammar models by class.

Referring to FIG. 20, 'What<A>' may be detected as speech recognition result based on the class-based grammar model 1720. <A> 2010 signifies an entry token representing A class. As a word including the entry token 2010 representing A class is detected, speech recognition device may perform speech recognition by using the grammar models by class in a class recognition mode 2020.

Based on the speech recognition result, 'I need </A>' 2030 or 'you send</A>' 2040 may be detected based on the grammar model 1730 belonging to A class in the class recognition mode 2020. </A> 2030 and 2040 signify exit tokens representing A class. In the class recognition mode 2020, the speech recognition device may perform speech recognition by returning from the class recognition mode 2020 to a general mode as a word including the exit tokens 2030 and 2040 is detected.

According to an example embodiment, a grammar model belonging to A class may be used so that words corresponding to a program name may be detected after the word for 'What </A>'. Therefore, a possibility of generating speech recognition error may become lower as a word not belonging to the program name is detected as speech recognition result after 'What </A>'. The speech recognition device may perform speech recognition by using only the grammar model of A class so as to detect words included in the grammar model of A class, or may perform speech recognition by setting weight corresponding to the grammar model of A class high. Furthermore, the entry token may also be included in front of a word for 'is a' like '<A>is a' instead of 'What'.

Meanwhile, when 'What' or 'is a' not including the entry token is detected, the speech recognition device may perform speech recognition in the general mode not in the class recognition mode.

The speech recognition device may successively detect 'is a' as speech recognition result in a general mode, again.

Figure 21:
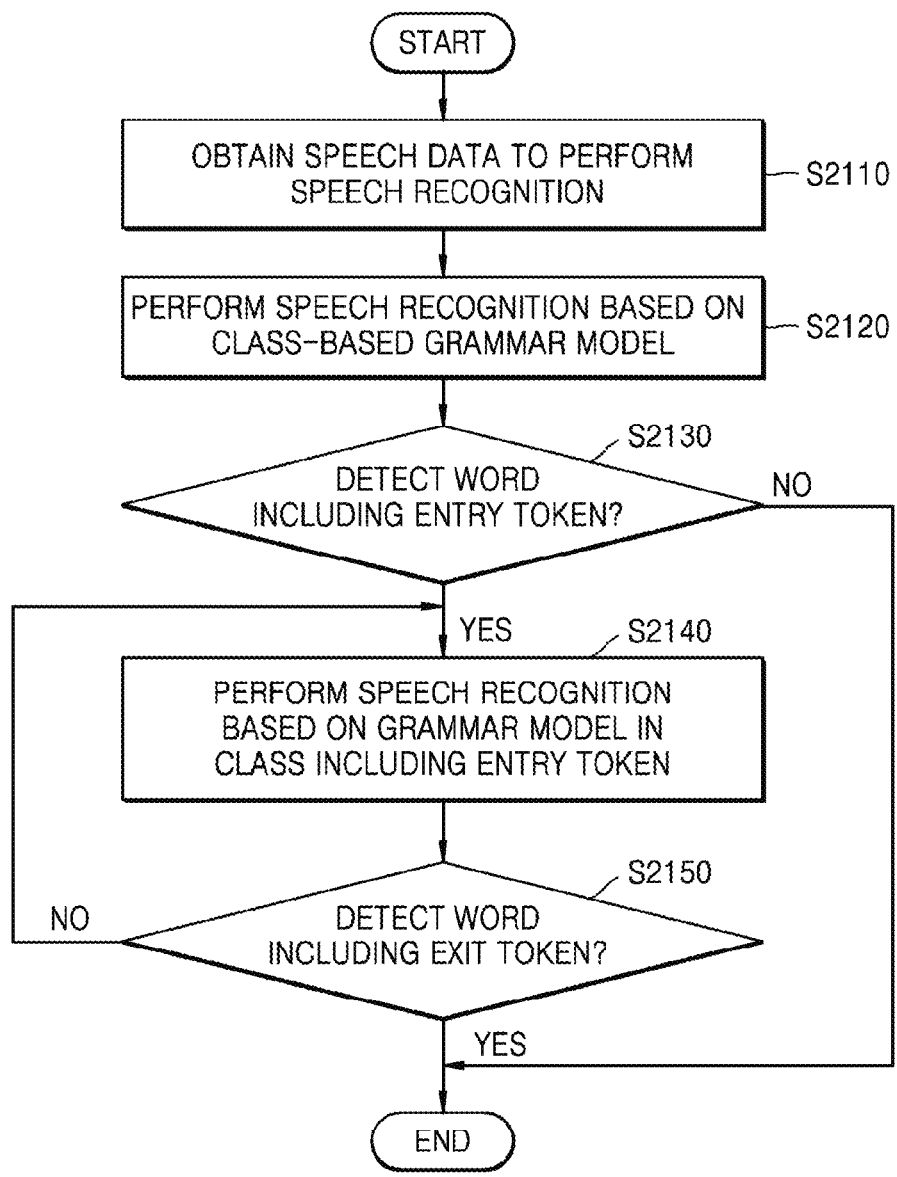
FIG. 21 is a flowchart illustrating an example method of performing speech recognition based on a class to which a word belongs.

FIG. 21 is a flowchart illustrating an example method of performing speech recognition based on a class to which a word belongs.

Referring to FIG. 21, a device performing speech recognition may obtain speech data to perform speech recognition in step S2110. Furthermore, in step S2120, the device performing speech recognition may perform speech recognition on the speech data based on the class-based grammar model 1720.

The class-based grammar model 1720 may include appearance probability information of a word including an entry token. Furthermore, the class-based grammar model 1720 may include various grammar models capable of being used during speech recognition. For example, the class-based grammar model 1720 may further include the first and second grammar models 1420 and 1430, and the grammar models 160 and 240 that are described above.

When the device performing speech recognition detects the word including the entry token in step S2130, speech recognition may be performed based on a grammar model of a class to which the entry token belongs in a class recognition mode in step S2140. The speech recognition device, after the word including the entry token, may perform speech recognition based on the grammar model in the class to which the entry token belongs on the next speech data.

Furthermore, the speech recognition device, when a word including an entry token representing other class is detected in the class recognition mode, may perform speech recognition based on the grammar model belonging to corresponding class.

In step S2150, when a word including an exit token is detected in the class recognition mode, may perform speech recognition by returning to a general recognition mode. For example, the speech recognition device may perform speech recognition by returning to step S2120 as the word including the exit token is detected.

Figure 22:
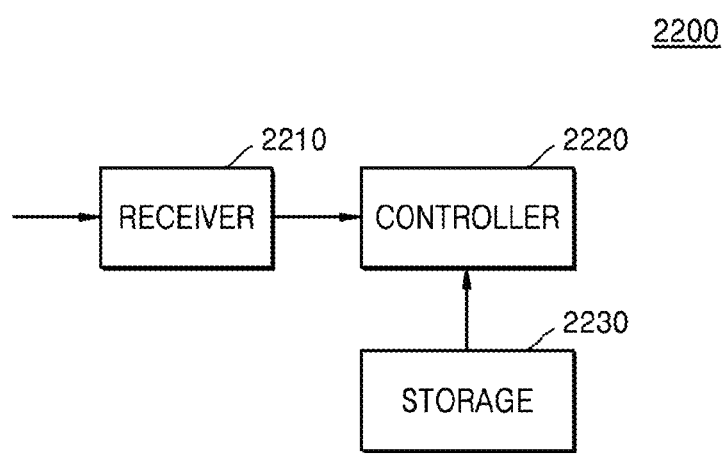
FIG. 22 is a block diagram illustrating an example internal configuration of a device for updating a grammar model.
Figure 23:
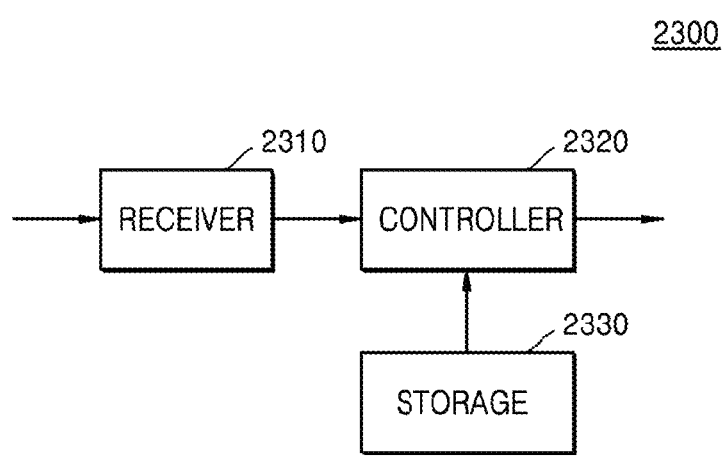
FIG. 23 is a block diagram illustrating an example internal configuration of a speech recognition device.

Hereinafter, a device for updating a grammar model and a device performing speech recognition will be described in more detail below with reference to FIGS. 22 and 23. FIGS. 22 and 23 illustrate a device 2200 updating a grammar model and a device 2300 performing speech recognition as separate devices, however, are only examples. For example, two devices, which are described above as that the device 2200 updating a grammar model is included in the device 2300 performing speech recognition, may be configured as one device. In FIGS. 22 and 23 and example embodiments as below, respective components included in the device 2200 updating a grammar model and the device 2300 performing speech recognition may be dispersed in a physical form or a logical form and arranged, or may be integrated.

The device 2200 updating a grammar model and the device 2300 performing speech recognition may include various devices capable of being used by a user. For example, the devices 2200 and 2300 may include a personal computer (PC), a laptop computer, a mobile phone, a tablet PC, a navigation terminal, a smart phone, a personal digital assistant (PDA), a portable multimedia player (PMP), and a digital broadcast receiver, or the like. However, these are only examples, the devices 2200 and 2300 may further include every device capable of communicating, which are developed and commercialized or will be developed in the future.

FIG. 22 is a block diagram illustrating an example internal configuration of a device for updating a grammar model.

Referring to FIG. 22, the device 2200 updating a grammar model may include a receiver (e.g., including receiver circuitry) 2210, a controller (e.g., including processing circuitry) 2220, and a storage (e.g., a memory) 2230. However, all components of FIG. 22 are not an essential component. The device 2200 may be realized by more components or less components than the illustrated components.

Hereinafter, the components will be sequentially described.

The receiver 2210 may obtain a corpus including at least one word. The corpus may include an OOV word that cannot be detected as a recognized word based on a grammar model. The receiver 2210 may be configured to transceive data with an external device through a wireless network such as a wireless internet, a wireless intranet, a wireless telephone, a wireless local area network (LAN), Wireless-Fidelity (Wi-Fi), Wi-Fi direct (WFD), three-generation (3G), four-generation (4G), Bluetooth, Infrared data association (IrDA), a radio frequency identification (RFID), a ultra wideband (UWB), Zigbee or a near field communication (NFC), or a wire network such as a wire telephone or a wire internet, or the like.

The controller 2220 may be configured to control a general operation of the device 2200. For example, the controller 2220 may be configured to update the grammar model based on the OOV word included in the corpus. The controller 2220 may be configured to split the OOV word into segments of smaller units and may be configured to update the grammar model using a segment to which a hint capable of recombining the segment into the original word is added. Furthermore, the controller 2220 may be configured to articulate the OOV word from among words included in a pronunciation dictionary, and may be configured to update the grammar model using the articulated OOV word. Furthermore, the controller 2220 may be configured to update a class-based grammar model or grammar models by class using an OOV word including an entry token or an exit token.

The storage 2230 may store a program for operating the controller 2220 and for controlling the device 2200, or input/output data (for example, audio data or grammar models). Grammar models capable of being stored in the storage 2230 may include a plurality of grammar models capable of being selectively used according to a prescribed condition. For example, the storage 2230 may store the first grammar model, the second grammar model, the class-based grammar model, and the grammar models by class, which are described above.

The storage 2230 may include at least one type of storage medium of a flash memory type, a hard disk type, a multimedia card micro type, a card type memory (for example, secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Furthermore, the device 2200 may also operate a web storage performing a storage function of the storage 2230 on the Internet.

FIG. 23 is a block diagram illustrating an example internal configuration of a speech recognition device.

Referring to FIG. 23, speech recognition device 2300 may include a receiver (e.g., including receiver circuitry) 2310, a controller (e.g., including processing circuitry) 2320, and a storage (e.g., including a memory) 2330. However, all components of FIG. 23 are not an essential component. The speech recognition device 2300 may be realized by more components or less components than the illustrated components.

Hereinafter, the components will be sequentially described.

The receiver 2310 may obtain speech data to perform speech recognition. For example, the speech data may include speech sound including human voice, conversation, or command. The speech recognition device 2300 may obtain a feature point of the speech sound and may output the speech sound and text. The receiver 2310 may be configured to transceive data with an external device through a wireless network such as a wireless internet, a wireless intranet, a wireless telephone, a wireless LAN, Wi-Fi, WFD, 3G, 4G, Bluetooth, IrDA, an RFID, a UWB, Zigbee or an NFC, or a wire network such as a wire telephone or a wire internet, or the like.

The controller 2320 may be configured to control a general operation of the speech recognition device 2300. For example, the controller 2320 may be configured to perform speech recognition using a grammar model, and when detected words or segments as the result include a hint for recombining, the words or segments may be recombined into the original word. Furthermore, the controller 2320, when the detected word as the speech recognition result is included in an articulation word list, may be configured to restore the detected word based on an articulation word list. Furthermore, the controller 2320, when the word detected as the speech recognition result corresponds to a first sequence of words, may be configured to perform speech recognition so that the words are detected in a prescribed sequence based on a second grammar model in a sequence mode. Furthermore, the controller 2320 may be configured to perform speech recognition in a class recognition mode or a general recognition mode based on whether the word detected as the speech recognition result includes an entry token or an exit token. The controller 2320, when a word including the entry token is detected, may be configured to perform speech recognition based on a grammar model belonging to a class represented by the entry token. Furthermore, the controller 2320, when a word including the exit token is detected, may be configured to perform speech recognition based on a class-based grammar model in a general mode.

The storage 2330 may store a program for operating the controller 2320 and for controlling the speech recognition device 2300, or input/output data (for example, audio data or grammar models). Grammar models capable of being stored in the storage 2330 may include a plurality of grammar models capable of being selectively used according to a prescribed condition. For example, the storage 2330 may store the first grammar model, the second grammar model, the class-based grammar model, and the grammar models by class, which are described above.

The storage 2330 may include at least one type of storage medium of a flash memory type, a hard disk type, a multimedia card micro type, a card type memory (for example, SD or XD memory), a RAM, a SRAM, a ROM, an EEPROM, a PROM, a magnetic memory, a magnetic disk, and an optical disk. Furthermore, the device 2300 may also operate a web storage performing a storage function of the storage 2330 on the Internet.

According to an example embodiment, the grammar models may be updated so that speech recognition may be performed on an OOV word with a lower false recognition rate.

Methods according to some example embodiments may be realized in a form of program command capable of being performed through various computer means and may be recorded on a non-transitory computer-readable recording medium. The non-transitory computer-readable recording medium may include program command, a data file, or a data structure alone or in combination. The program command recorded on the recording medium may be specially designed and configured for the disclosure, or may be known to those of ordinary skill in the art and used by them. The non-transitory computer-readable recording medium includes, for example, magnetic media such as a hard disk, a floppy disc, and a magnetic tape, optical media such as a compact disc-read only memory (CD-ROM) or a digital versatile disc (DVD), magneto-optical media such as a floptical disk, and a hardware device specially configured to store and perform program command such as a ROM, a RAM, or a flash memory. The program command may include, for example, not only a machine language code formed by a compiler but also a high-level language code capable of being executed by computer using an interpreter.

It should be understood that the example embodiments described herein should be considered in a descriptive sense only and not for purposes of limitation. Descriptions of the features or aspects within each example embodiment should typically be considered as available for other similar features or aspects in other exemplary embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of recognizing a voice signal, the method comprising:
    obtaining a first voice signal and a second voice signal;
    recognizing the first voice signal by applying a first voice recognition model to the obtained first voice signal;
    based on at least the applying of the first voice recognition model, determining whether the first voice signal includes a signal corresponding to a word from among a plurality of predefined words;
    selecting a second voice recognition model from among a plurality of second voice recognition models, based on at least the determining that the first voice signal includes the signal corresponding to the word, each of the plurality of the second voice recognition models corresponding to at least one respective predefined word of the plurality of predefined words;
    recognizing the second voice signal based on the selected second voice recognition model;
    determining whether the second voice signal includes a signal corresponding to another word from among the plurality of predefined words or a signal corresponding to an exit token associated with the selected second voice recognition model, based on the recognition result for the second voice signal;
    selecting the first voice recognition model, based on at least the determining that the second voice signal includes the signal corresponding to the exit token associated with the selected second voice recognition model;
    selecting a third voice recognition model from among the plurality of second voice recognition models, based on at least the determining that the second voice signal includes the signal corresponding to the other word; and
    recognizing a third voice signal, which is obtained after the second voice signal, based on the selected first voice recognition model or the selected third voice recognition model.

2. The method of claim 1, wherein each of the plurality of predefined words, which is obtained based on the applying of the first voice recognition model, is a word including an entry token.

3. The method of claim 2, wherein the first voice signal is recognized in a class recognition mode converted from a general mode, based on the determining that the first voice signal includes the signal corresponding to the predefined word including the entry token, in the general mode, the first voice signal is recognized based on the first voice recognition model, and
    in the class recognition mode, the first voice signal is recognized based on the second voice recognition model.

4. The method of claim 3, wherein the first voice signal is recognized in the general mode converted from the class recognition mode, based on the determining that the first voice signal includes a signal corresponding to a word including an exit token associated with the class recognition mode.

5. A device for recognizing a voice signal, the device comprising:
    a receiver for obtaining a first voice signal and a second voice signal;
    a memory for storing a first voice recognition model and a plurality of second voice recognition models; and
    at least one processor configured for:
    recognizing the first voice signal by applying the first voice recognition model to the obtained first voice signal,
    determining, based on the applying of the first voice recognition model, whether the first voice signal includes a signal corresponding to a word from among a plurality of predefined words,
    selecting a second voice recognition model from among the plurality of second voice recognition models, based on the determining that the first voice signal includes the signal corresponding to the word, each of the plurality of the second voice recognition models corresponding to at least one respective predefined word of the plurality of predefined words, and
    recognizing the second voice signal based on the selected second voice recognition model,
    determining whether the second voice signal includes a signal corresponding to another word from among the plurality of predefined words or a signal corresponding to an exit token associated with the selected second voice recognition model, based on the recognition result for the second voice signal, selecting the first voice recognition model, based on at least the determining that the second voice signal includes the signal corresponding to the exit token associated with the selected second voice recognition model, selecting a third voice recognition model from among the plurality of second voice recognition models, based on at least the determining that the second voice signal includes the signal corresponding to the other word, and recognizing a third voice signal, which is obtained after the second voice signal, based on the selected first voice recognition model or the selected third voice recognition model.

6. The device of claim 5, wherein each of the predefined words, obtained based on at least the applying of the first voice recognition model, is a word including an entry token.

7. The device of claim 6, wherein the processor is further configured so that the first voice signal is recognized in a class recognition mode converted from a general mode, based on the determining that the first obtained voice signal includes the signal corresponding to the predefined word including the entry token, in the general mode, the first voice signal is recognized based on the first voice recognition model, and in the class recognition mode, the first voice signal is recognized based on the selected second voice recognition model.

8. The device of claim 7, wherein the processor is further configured so that the first voice signal is recognized in the general mode converted from the class recognition mode, based on the determining that the first voice signal includes a signal corresponding to a word including an exit token associated with the class recognition mode.

9. A non-transitory computer-readable storage medium configured to store one or more computer programs including instructions that, when executed by at least one processor, cause the at least one processor to control performing of the method of claim 1.

* * * * *